(12) United States Patent
Zhuang et al.

(10) Patent No.: US 9,857,900 B2
(45) Date of Patent: Jan. 2, 2018

(54) ARRAY SUBSTRATE, TOUCH DISPLAY PANEL AND DRIVING METHOD FOR ARRAY SUBSTRATE

(71) Applicants: Xiamen Tianma Micro-Electronics Co., Ltd., Xiamen (CN); Tianma Micro-Electronics Co., Ltd., Shenzhen (CN)

(72) Inventors: Zhilong Zhuang, Xiamen (CN); Jiancai Huang, Xiamen (CN)

(73) Assignees: XIAMEN TIANMA MICRO-ELECTRONICS CO., LTD., Xiamen (CN); TIANMA MICRO-ELECTRONICS CO., LTD., Shenzhen (CN)

( * ) Notice: Subject to any disclaimer, the term of this patent is extended or adjusted under 35 U.S.C. 154(b) by 238 days.

(21) Appl. No.: 14/858,908

(22) Filed: Sep. 18, 2015

(65) Prior Publication Data
US 2016/0334908 A1 Nov. 17, 2016

(30) Foreign Application Priority Data

May 14, 2015 (CN) .......................... 2015 1 0245398

(51) Int. Cl.
*G06F 3/041* (2006.01)
*G06F 3/044* (2006.01)

(52) U.S. Cl.
CPC ............ *G06F 3/0412* (2013.01); *G06F 3/044* (2013.01); *G06F 3/0416* (2013.01); *G09G 2310/0286* (2013.01)

(58) Field of Classification Search
None
See application file for complete search history.

(56) References Cited

U.S. PATENT DOCUMENTS

| | | | |
|---|---|---|---|
| 2012/0044166 A1* | 2/2012 | Mizuhashi | G06F 3/0412 345/173 |
| 2013/0127779 A1 | 5/2013 | Lillie et al. | |
| 2014/0104205 A1 | 4/2014 | Huang | |
| 2014/0267156 A1 | 9/2014 | Koga et al. | |

FOREIGN PATENT DOCUMENTS

| | | | |
|---|---|---|---|
| CN | 104537972 A | 4/2015 | |
| CN | 104820520 A | 8/2015 | |

\* cited by examiner

*Primary Examiner* — Gustavo Polo
(74) *Attorney, Agent, or Firm* — Faegre Baker Daniels LLP

(57) ABSTRACT

An array substrate, a touch display panel and a driving method, where a driver circuit is in a non-display region of the array substrate, and the driver circuit includes: a first shift register including a first scan signal outputting terminal, where the first shift register is configured to output a first touch scan signal from the first scan signal outputting terminal within an interval between frame scanning periods of the array substrate; and a touch scanning circuit corresponding to the first shift register and including a first scan signal inputting terminal and a touch signal outputting terminal, where the first scan signal inputting terminal of the touch scanning circuit is connected with the first scan signal outputting terminal of the first shift register, and the touch scanning circuit is configured to output a touch signal from the touch signal outputting terminal thereof according to the first touch scan signal.

26 Claims, 17 Drawing Sheets

ARRAY SUBSTRATE, TOUCH DISPLAY PANEL AND DRIVING METHOD FOR ARRAY SUBSTRATE

CROSS-REFERENCE TO RELATED APPLICATION

This application claims priority to Chinese Application No. 201510245398.X, filed May 14, 2015, which is herein incorporated by reference in its entirety.

TECHNICAL FIELD

The present disclosure relates to the field of displaying technologies, in particular to an array substrate, a touch display panel and a driving method for an array substrate.

BACKGROUND

In the field of displaying technologies, both a display function and a touch sensing function are integrated into a display panel for more and more products, so that the thickness of the display panel is reduced significantly. In particular, an in-cell touch display panel is most effective in reducing the thickness.

In the in-cell touch display panel, touch electrodes are integrated into an array substrate, and driven by a touch driving circuit disposed in a non-display region on the array substrate. The non-display region on the array substrate is typically further provided with a scan driving circuit, which mainly includes shift registers corresponding to the respective rows of pixel units in a display region. In a frame scanning process, each row of pixel units are turned on by a display scan signal outputted from the shift register.

Because both the scan driving circuit and the touch driving circuit occupy layout areas in the non-display region, integrating the touch electrodes into the array substrate will inevitably increase the size (e.g. width) of the non-display region, so that the border frame region of the display panel is increased, leading to a difficulty in frame narrowing.

SUMMARY

In view of the above, embodiments of the disclosure provide an array substrate, a touch display panel and a driving method for the array substrate.

Some embodiments of the disclosure provide an array substrate, which includes a display region, a non-display region surrounding the display region, pixel units arranged as an array in the display region, and a driver circuit disposed in the non-display region, and the driver circuit includes:

a first shift register including a first scan signal outputting terminal, where the first shift register is configured to output a first touch scan signal from the first scan signal outputting terminal within an interval between frame scanning periods of the array substrate; and a touch scanning circuit corresponding to the first shift register and including a first scan signal inputting terminal and a touch signal outputting terminal, where the first scan signal inputting terminal of the touch scanning circuit is connected with the first scan signal outputting terminal of the first shift register, and the touch scanning circuit is configured to output a touch signal from the touch signal outputting terminal thereof according to the first touch scan signal.

Some embodiments of the disclosure provide a touch display panel, which includes a color filter substrate, the above array substrate and a driver chip connected with the driver circuit of the array substrate.

Some embodiments of the disclosure provide a driving method for an array substrate, where the array substrate includes: a display region, a non-display region surrounding the display region, pixel units arranged as an array in the display region, and a driver circuit disposed in the non-display region, and the driver circuit includes a first shift register and a touch scanning circuit corresponding to the first shift register, and the driving method includes:

outputting a first touch scan signal from a first scan signal outputting terminal of the first shift register in an interval between frame scanning periods of the array substrate; and outputting a touch signal from a touch signal outputting terminal of the touch scanning circuit according to the first touch scan signal.

With the technical solutions described in the disclosure, the driver circuit disposed in the non-display region includes the first shift register, where the first shift register is configured to output the first touch scan signal to the touch scanning circuit in an interval between frame scanning periods to enable the touch scanning circuit to output the touch signal from a touch signal outputting terminal thereof according to the first touch scan signal, and is also configured to output a display scan signal in the frame scanning period. Thus, in the technical solutions described in the disclosure, the first shift register is reused in the frame scanning period and the interval between frame scanning periods, so that the provision of dedicated shift registers for the touch phase between frame scanning periods is eliminated. In this case, the number of the circuit elements in the non-display region of the array substrate is effectively reduced, so that the layout area occupied by the driver circuit in the non-display region is decreased, thereby reducing the width of the non-display region, satisfying the requirement for frame narrowing. Besides, the number of the scan lines required for the touch sensing function by the driving chip can be reduced, and the number of I/O ports in the driving chip can also be reduced.

While multiple embodiments are disclosed, still other embodiments of the disclosure will become apparent to those skilled in the art from the following detailed description, which shows and describes illustrative embodiments of the disclosure. Accordingly, the drawings and detailed description are to be regarded as illustrative in nature and not restrictive.

BRIEF DESCRIPTION OF THE DRAWINGS

Other features, objects and advantages of the disclosure will become apparent from the following detailed description made to nonrestrictive embodiments with reference to the accompanying drawings, in which.

Figure 1:
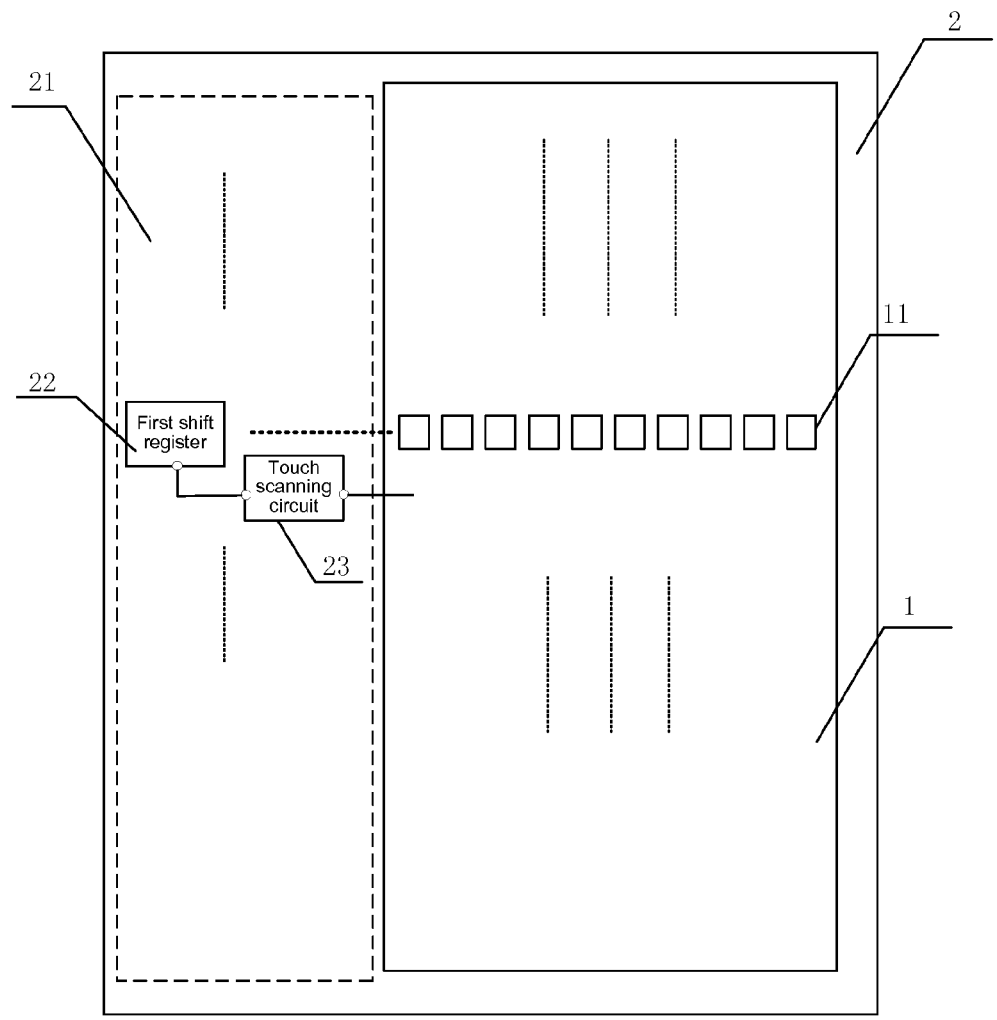
FIG. 1 is a schematic top view showing a first instance of an array substrate, according to embodiments of the disclosure.

While the disclosure is amenable to various modifications and alternative forms, embodiments have been shown by way of example in the drawings and are described in detail below. The intention, however, is not to limit the disclosure to the particular embodiments described. On the contrary, the disclosure is intended to cover all modifications, equivalents, and alternatives falling within the scope of the disclosure as defined by the appended claims.

DETAILED DESCRIPTION

Technical solutions of the disclosure will be further illustrated through embodiments below in conjunction with the accompanying drawings. It may be understood that embodiments described herein are for explaining the disclosure rather than limiting the disclosure. In addition, it should be illustrated that partial content associated with the disclosure rather than all content is illustrated in the accompanying drawings for ease of description.

In the related art, as described above, integrating the touch sensing function into the array substrate includes provision of a driver circuit for touch scanning operations on the array substrate, so that the width of the non-display region is increased, frame narrowing for the display panel is hard to be achieved, and a large number of scan lines and Input/Output (I/O) ports dedicated for the touch sensing function are additionally provided on a driver chip. In order to avoid this, the disclosure provides a technical solution in which shift registers used for displaying are reused to provide touch scan signals for a touch scanning operation.

FIG. 1 is a schematic top view showing a first instance of an array substrate, according to embodiments of the disclosure. As shown in FIG. 1, the array substrate includes a display region 1 and a non-display region 2 surrounding the display region 1. Pixel units 11 arranged as an array are disposed in the display region 1, and a driver circuit 21 is disposed in the non-display region. The driver circuit 21 includes a plurality of first shift registers 22, and a touch scanning circuit 23 corresponding to each of the first shift registers 22. The first shift register 22 includes a first scan signal outputting terminal, and is configured to output a first touch scan signal from the first scan signal outputting terminal within an interval between frame scanning periods of the array substrate. The touch scanning circuit 23 includes a first scan signal inputting terminal and a touch signal outputting terminal, and the first scan signal inputting terminal of the touch scanning circuit 23 is connected with the first scan signal outputting terminal of the first shift register 22. The touch scanning circuit 23 is configured to output a touch signal (e.g. a touch driving signal) from a touch signal outputting terminal thereof according to the first touch scan signal.

In embodiments of the disclosure, the driver circuit disposed in the non-display region includes the first shift registers 22, where the first shift register 22 is configured to output the first touch scan signal in an interval between frame scanning periods, and the touch scanning circuit is configured to output the touch signal according to the first touch scan signal; further, the first shift register 22 is also configured to output a display scan signal in the frame scan period (i.e. a display phase). As such, in embodiments of the disclosure, the first shift register is reused in both the frame scanning period and the interval between frame scanning periods, so that a need for shift registers dedicated for the touch operation in the interval between frame scanning periods (i.e. a touch phase) is eliminated. In this case, circuit elements required for the non-display region of the array substrate are effectively reduced, so that the layout area required for the driver circuit in the non-display region is decreased, thereby reducing the width of the non-display region, satisfying the requirement for frame narrowing. Besides, the scan lines required for the touch sensing function by the driving chip can be reduced, and the I/O ports on the driving chip can also be reduced.

Figure 2:
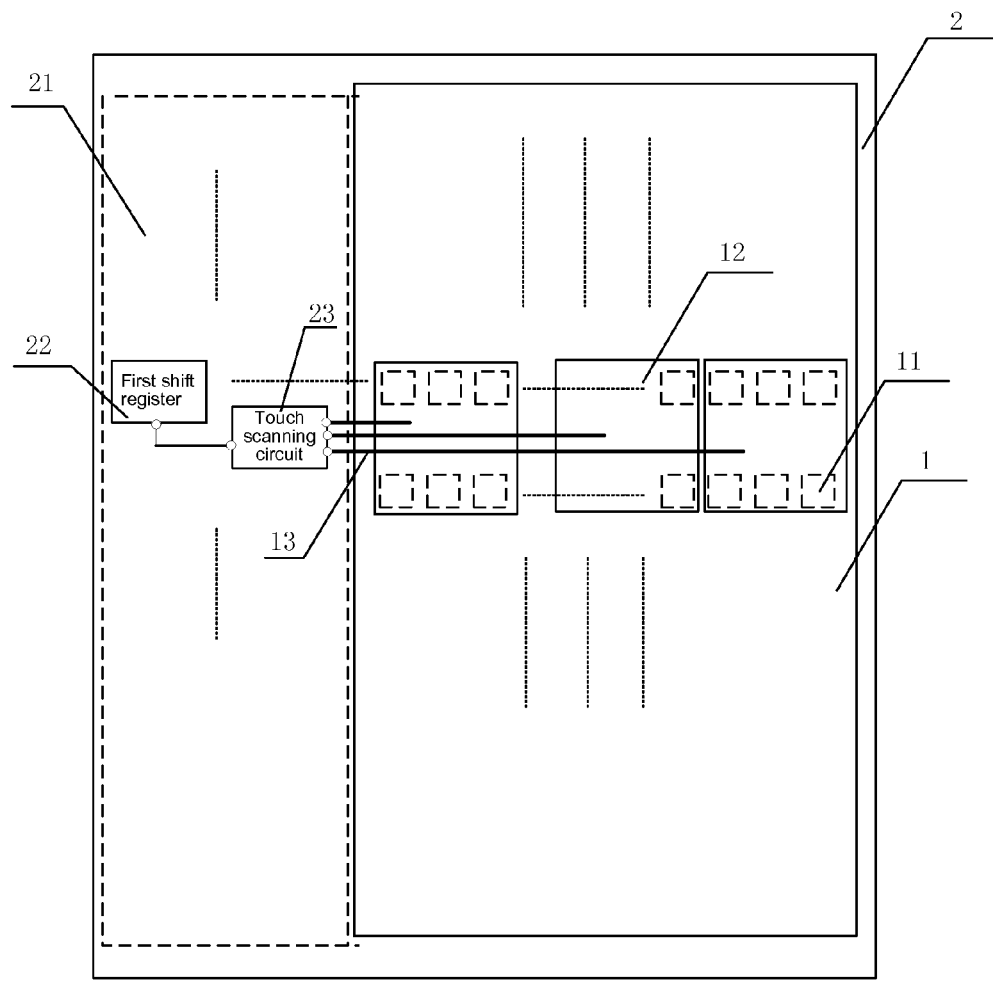
FIG. 2 is a schematic view showing an arrangement of touch electrodes on the array substrate, according to embodiments of the disclosure.

In embodiments shown in FIG. 1, the touch scanning circuit 23 is configured to drive the touch electrodes disposed on the display region of the array substrate. As shown in FIG. 2 which is a schematic view showing an arrangement of touch electrodes on the array substrate, according to embodiments of the disclosure, to achieve the touch sensing function, a plurality of touch electrodes 12 are disposed in the display region 1 of the array substrate. The plurality of touch electrodes 12 may be embodied as a dedicated layer on the array substrate, or may be formed by a common electrode on the array substrate. That is, the common electrode in the display region 1 of the array substrate is divided into the touch electrodes 12 arranged in a matrix, each of the touch electrodes 12 is assigned with a corresponding touch wiring 13, and each row of the touch electrodes 12 are connected with the touch signal outputting terminal of one of the touch scanning circuits 23 via the corresponding touch wiring 13.

The technical solution in embodiments of the disclosure can be applied to an In-Plane Switching (IPS) technique or a Fringe Field Switching (FFS) technique. In the IPS technique, the touch electrodes divided from the common electrode are located in the same layer as the pixel electrodes, while in the FFS technique, the touch electrodes 12 divided from the common electrode and the pixel electrodes are located in different layers, and in this case, the touch electrodes 12 may be located in a film layer above or below the pixel electrodes.

Still referring to FIG. 2, a plurality of pixel units 11 are disposed on the array substrate, and each touch electrode 12 corresponds to some of the plurality of pixel units 11. Specifically, in the case that the touch electrodes 12 and the pixel electrodes are located in the same layer, each row of touch electrodes 12 and pixel electrodes of the pixel units 11 corresponding to this row of touch electrodes 12 are distributed within one same region of the array substrate, and this row of touch electrodes 12 are arranged alternately with the pixel electrodes. In the case that the touch electrodes 12 and the pixel electrodes are located in different layers, each row of touch electrodes 12 substantially overlap the pixel electrodes of the pixel units 11 corresponding to this row of touch electrodes 12 in a light transmission direction of the array substrate.

Figure 3:
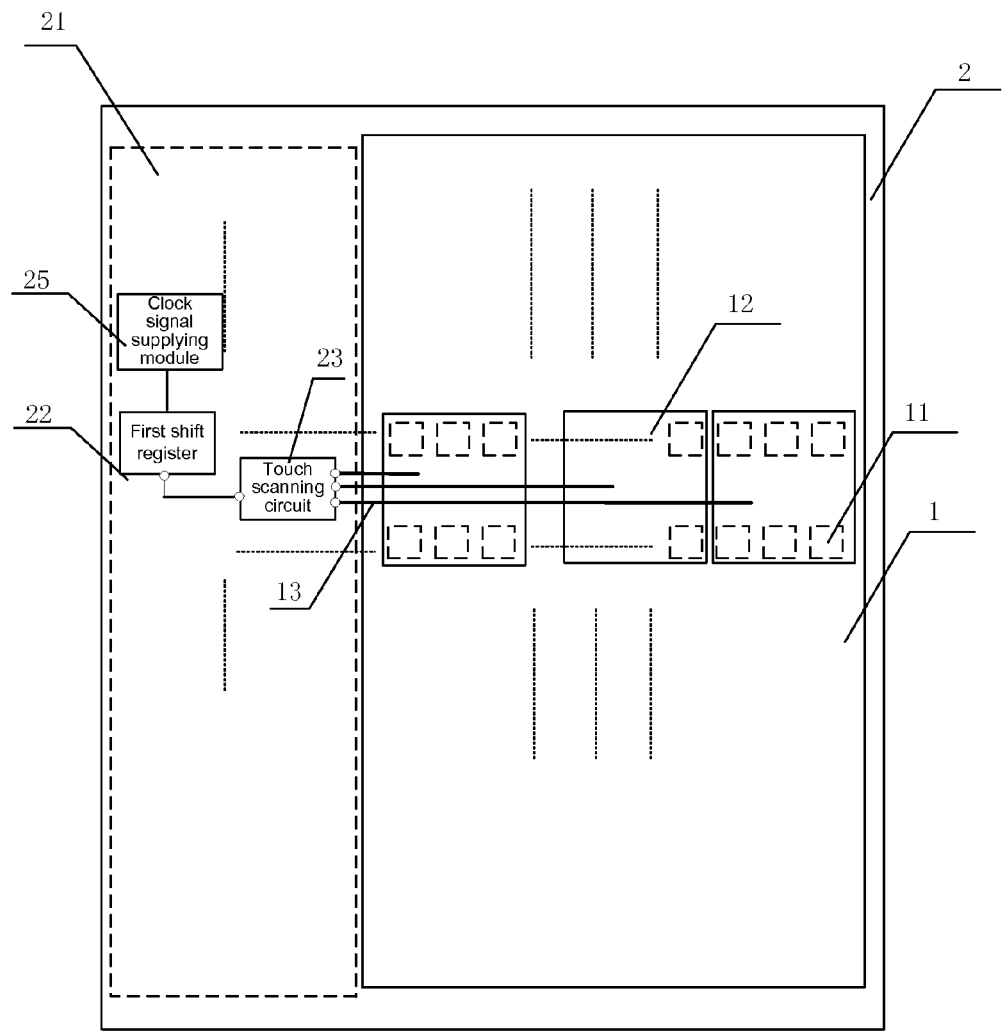
FIG. 3 is a schematic view showing a structure of a second instance of an array substrate, according to embodiments of the disclosure.

FIG. 3 is a schematic view showing a structure of a second instance of an array substrate, according to embodiments of the disclosure. As shown in FIG. 3, the driver circuit in the array substrate further includes a clock signal supplying module 25 connected with the first shift register 22. Since the diver circuit operates in both the frame scanning process (i.e. the display phase) and the interval between the frame scanning processes (i.e. the touch phase), the first shift register 22 is required to generate different scan signals in the display phase and the touch phase according to different clock signals. For example, in the frame scanning process, the first shift register 22 is configured to generate a first display scan signal according to the first clock signal provided by the clock signal supplying module 25; while in the interval between frame scanning processes, the first shift register 22 is configured to generate a first touch scan signal according to the second clock signal provided by the clock signal supplying module 25. In the disclosure, the frame scanning process refers to a period for displaying an image frame, and hence is also called as display phase, while the interval between frame scanning processes refers to a period of performing a touch scanning operation, and hence is also called as touch phase.

Figure 4:
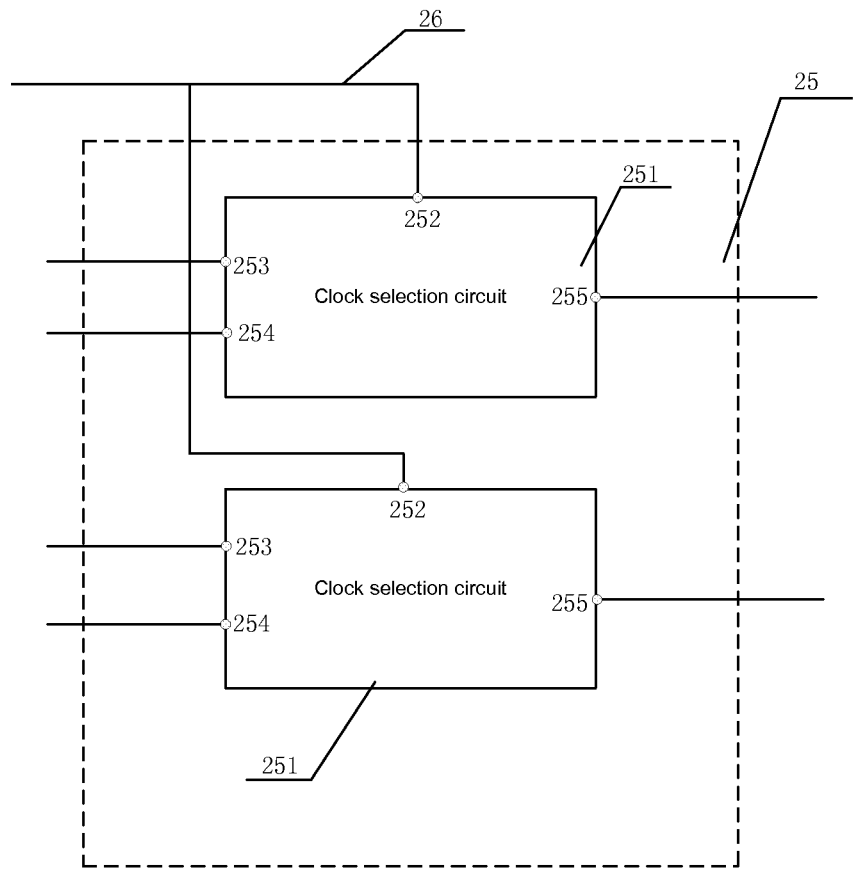
FIG. 4 is a schematic view showing a structure of the clock signal supplying module shown in FIG. 3, according to embodiments of the disclosure.

FIG. 4 is a schematic view showing a structure of the clock signal supplying module 25 shown in FIG. 3, according to embodiments of the disclosure. As shown in FIG. 4, the clock signal supplying module 25 includes at least one clock selection circuit 251, and the clock selection circuit 251 includes a clock selection control terminal 252, a first clock signal inputting terminal 253, a second clock signal inputting terminal 254, and a clock signal outputting terminal 255, where the clock selection control terminal 252 is connected with an operating mode signal line 26, and the clock signal outputting terminal 255 is connected with the first shift register. The clock selection circuit 251 is configured to connect the first clock signal inputting terminal 253 with the clock signal outputting terminal 255 when receiving a display scan mode signal from the operating mode signal line 26; and to connect the second clock signal inputting terminal 254 with the clock signal outputting terminal 255 when receiving a touch scan mode signal from the operating mode signal line 26. It can be known from above that the operating mode signal line 26 operates as an instruction line for determining whether the array substrate operates in the display phase or in the touch phase.

Figure 5:
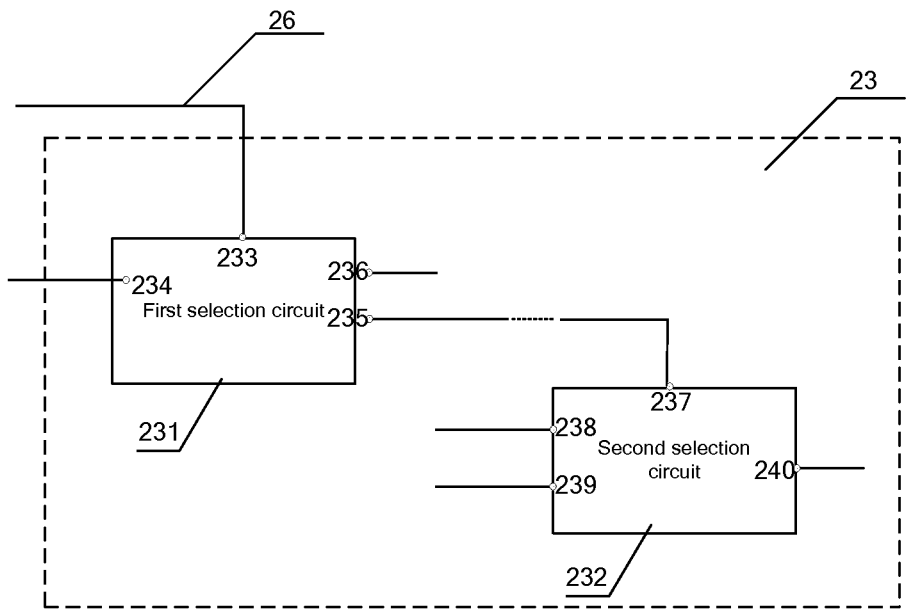
FIG. 5 is a schematic view showing a structure of the touch scanning circuit shown in FIG. 3, according to embodiments of the disclosure.

FIG. 5 is a schematic view showing a structure of the touch scanning circuit shown in FIG. 3, according to embodiments of the disclosure. As shown in FIG. 5, the touch scanning circuit 23 includes a first selection circuit 231 and a second selection circuit 232, where the first selection circuit 231 includes a first selection control terminal 233, a first scan signal inputting terminal 234, a touch scan signal outputting terminal 235 and a display scan signal outputting terminal 236.

In embodiments, the first selection circuit 231 is connected with the first shift register, and the first selection control terminal 233 of the first selection circuit 231 is connected with the operating mode signal line 26, and the first scan signal inputting terminal 234 is connected with the first scan signal outputting terminal of the first shift register. When receiving the display scan mode signal from the operating mode signal line 26, the first selection circuit 231 connected with the first shift register is configured to output, via the display scan signal outputting terminal 236, the first display scan signal received at the first scan signal inputting terminal 234 of the first selection circuit 231, and when receiving the touch scan mode signal from the operating mode signal line 26, the first selection circuit 231 is configured to output, via the touch scan signal outputting terminal 235, the first touch scan signal received at the first scan signal inputting terminal 234 of the first selection circuit 231.

The second selection circuit 232 includes a second selection control terminal 237, a common voltage signal inputting terminal 238, a touch signal inputting terminal 239 and a first signal outputting terminal 240, where the common voltage signal inputting terminal 238 is connected with a common signal line, the touch signal inputting terminal 239 is connected with a touch signal line, and the first signal outputting terminal 240 is connected with the touch wiring. The second selection circuit 232 is configured to output, via the first signal outputting terminal 240, the touch signal received at the touch signal inputting terminal 239, or to output, via the first signal outputting terminal 240, the common voltage signal received at the common voltage signal inputting terminal 238, depending on the type of the signal received by the second selection control terminal 237.

Figure 6:
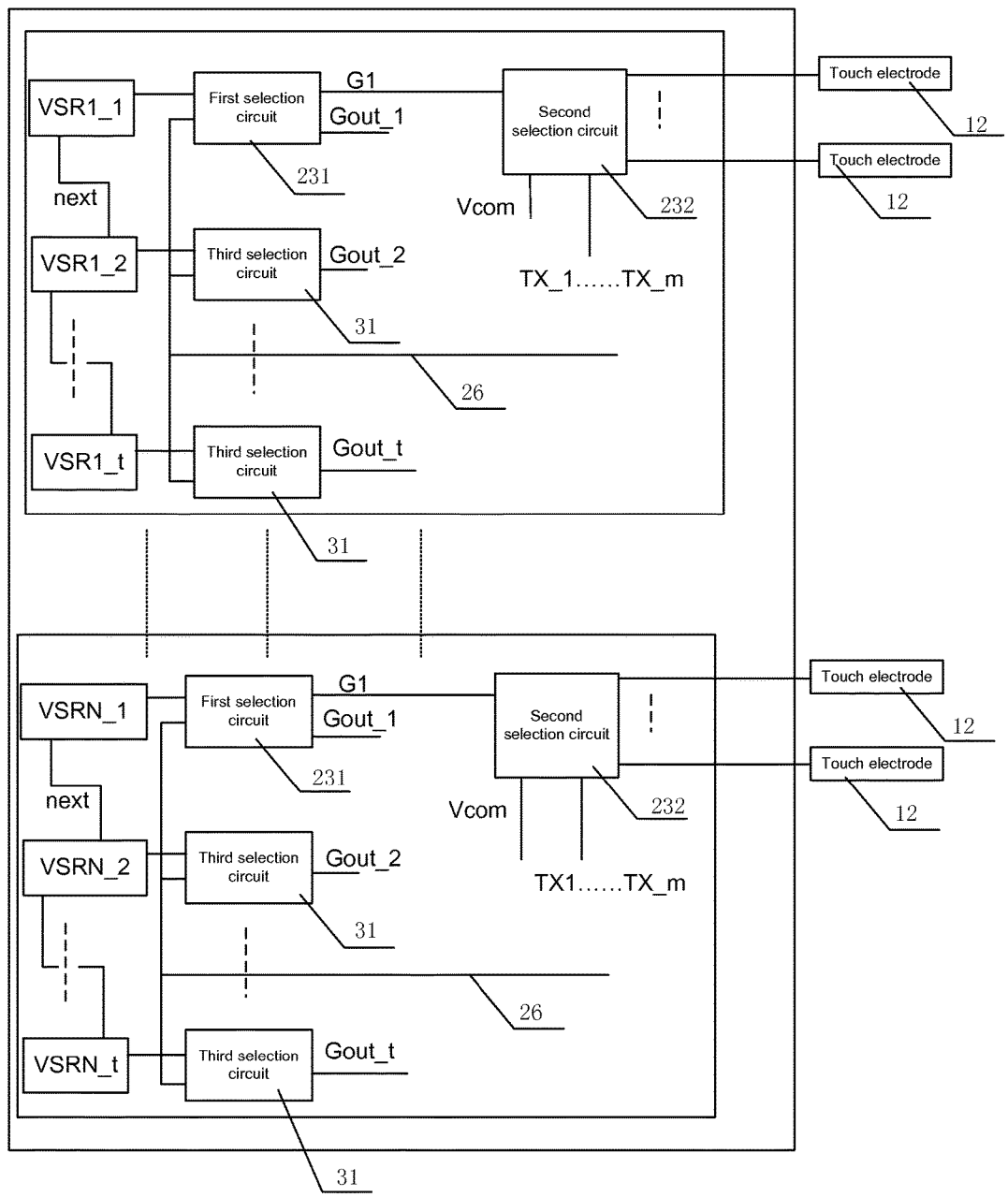
FIG. 6 is a schematic view showing a first correspondence relationship between shift registers and touch scanning circuits, according to embodiments of the disclosure.

FIG. 6 is a schematic view showing a first correspondence relationship between shift registers and touch scanning circuits, according to embodiments of the disclosure. As shown in FIG. 6, the driver circuit includes a plurality of cascadedly-connected shift registers respectively corresponding to the rows of pixel units on the array substrate (in such a way that each of the plurality of shift registers corresponds to one row of pixel units). The plurality of cascadedly-connected shift registers are divided into at least two groups, with each group of shift registers being configured to drive at least two (consecutive) rows of pixel units. The first shift register described above is represented by the initial shift register (i.e., the first one) in each group of shift registers. In embodiments shown in FIG. 6, the plurality of cascadedly-connected shift registers are divided into N groups of shift registers, where N is a positive integer. The first group of shift registers includes a number t of shift registers VSR1_1, VSR1_2, . . . , VSR1_t. The initial shift register in each group of shift registers is configured as the first shift register described above, and is connected with the first selection circuit 231. The first selection control terminal of the first selection circuit 231 is connected with the operating mode signal line 26, and the first selection circuit 231 selects the operating mode according to the operating mode signal from the operating mode signal line 26. Within the interval between frame scanning processes, the shift register VSR1_1 outputs a first touch scan signal G1 to the first selection circuit 231; and in the frame scanning process, the shift register VSR1_1 outputs a first display scan signal Gout_1 to the corresponding scan line.

Also, a third selection circuit 31 is provided for each of shift registers in each group of shift registers except for the initial shift register, a third selection control terminal of which is connected with the operating mode signal line 26, an input terminal of which is connected with the scan signal outputting terminal of the corresponding shift register in the group of shift registers except for the initial shift register (that is, for the first group of shift registers, each of the shift registers VSR1_2 to VSR1_t except for the shift register VSR1_1 is connected with the corresponding third selection circuit 31), and an output terminal of which is connected with a scan line of the array substrate. When receiving a display scan mode signal from the operating mode signal line 26, the third selection circuit 31 is configured to output the display scan signal received from the scan signal inputting terminal of the corresponding shift register to the scan line of the array substrate; and within the interval between frame scanning periods, the third selection circuit 31 outputs a termination signal to turn off the pixel units connected with the scan line, in order to reduce the impact on the pixel units in the touch phase.

Also, in embodiments shown in FIG. 6, considering that the touch scanning circuit 23 outputs the touch signal based on only the control by the first shift register, the touch scan signal outputting terminal of the first selection circuit 231 connected with the first shift register VSR1_1 is connected with the second selection control terminal of the second selection circuit 232. The second selection circuit 232 is configured to output touch signals TX_1, TX_2, . . . , TX_m received at the touch signal inputting terminal to the respective touch electrodes 12 via the first signal outputting terminal in the time period of receiving the first touch scan signal G1. Depending on the number m of the touch electrodes in each row of touch electrodes, the first signal outputting terminal may include m ports, each of which corresponds to one touch electrode. The second selection circuit 232 is also configured to output the common voltage signal Vcom received at the common voltage signal inputting terminal to the touch electrodes 12 via the first signal outputting terminal in other time periods.

Also, in embodiments shown in FIG. 6, as for each group of shift registers, the first touch scan signal outputted by the initial shift register in the group of shift registers is used to control the second selection circuit to output touch signals within the interval between frame scanning periods. Therefore, it is required to limit the time duration of the touch scan signals outputted by each shift register from the group of shift registers. That is, the time duration of the first touch scan signal generated by the initial shift register in each group of shift registers according to the second clock signal provided by the clock signal supplying module is longer than the time duration of the touch scan signals generated by the remaining shift registers from the group of shift registers, so as to satisfy the touch requirement.

Figure 7:
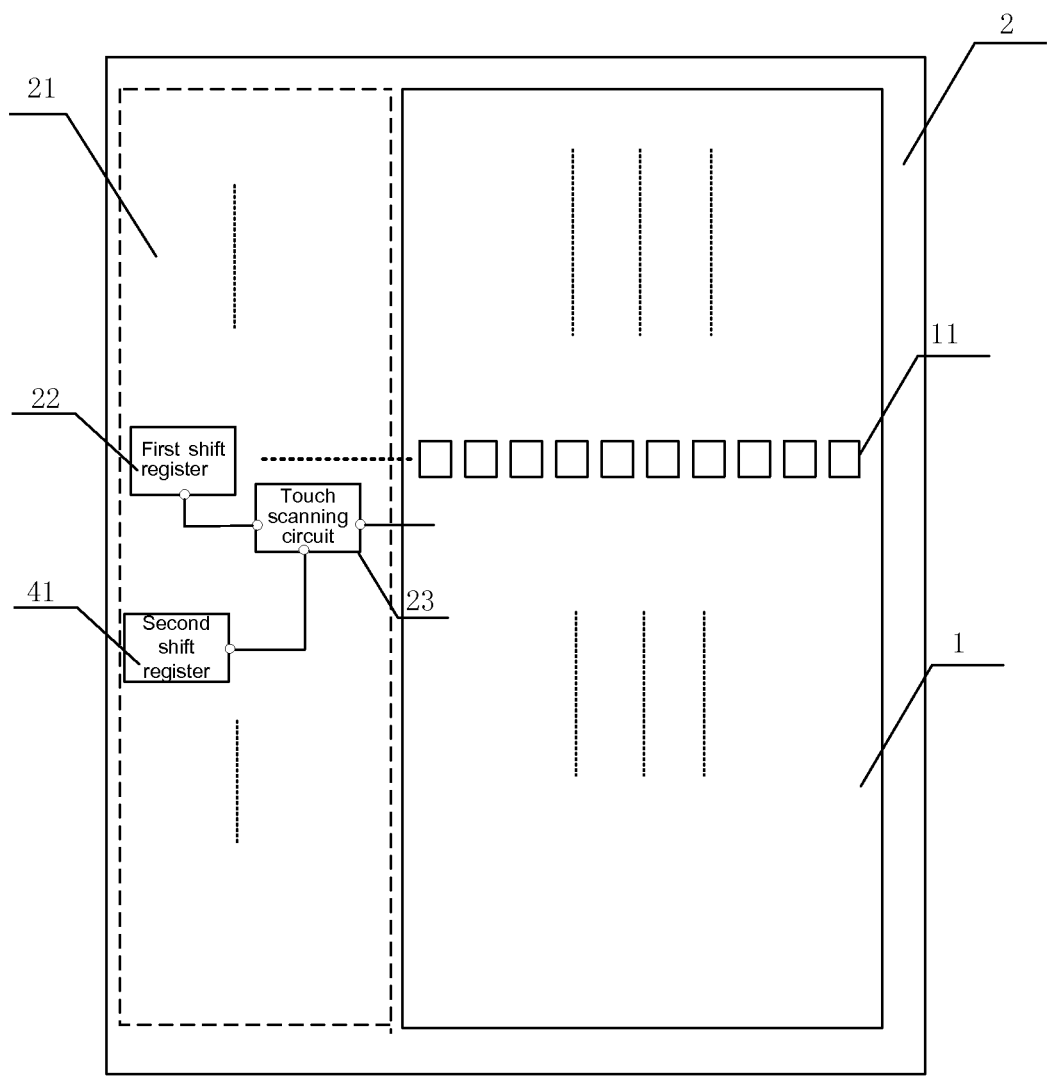
FIG. 7 is a schematic view showing a structure of a third instance of an array substrate, according to embodiments of the disclosure.

In embodiments shown in FIG. 6, each touch scanning circuit is configured to output the touch signal according to the first touch scan signal from the first shift register. In embodiments, the driver circuit further includes a plurality of second shift registers, and the touch scanning circuit is configured to output the touch signal according to touch scan signals outputted from the first shift register and the second shift register. Reference is made now to FIG. 7 which is a schematic view showing a structure of a third instance of an array substrate, according to embodiments of the disclosure, in additional to first shift registers 22, the driver circuit further includes second shift registers 41, where each second shift register 41 includes a second scan signal outputting terminal, and is configured to output a second touch scan signal via the second scan signal outputting terminal within the interval between frame scanning periods of the array substrate.

The touch scanning circuit 23 further includes a second scan signal inputting terminal which is connected with the second scan signal outputting terminal of the second shift register 41, and the touch scanning circuit 23 is configured to output a touch signal via a touch signal outputting terminal thereof according to both the first touch scan signal and the second touch scan signal.

As such, in embodiments shown in FIG. 7, the touch scanning circuit 23 is configured to output a touch signal according to both the first touch scan signal outputted from the first shift register 22 and the second touch scan signal outputted from the second shift register 41.

Figure 8:
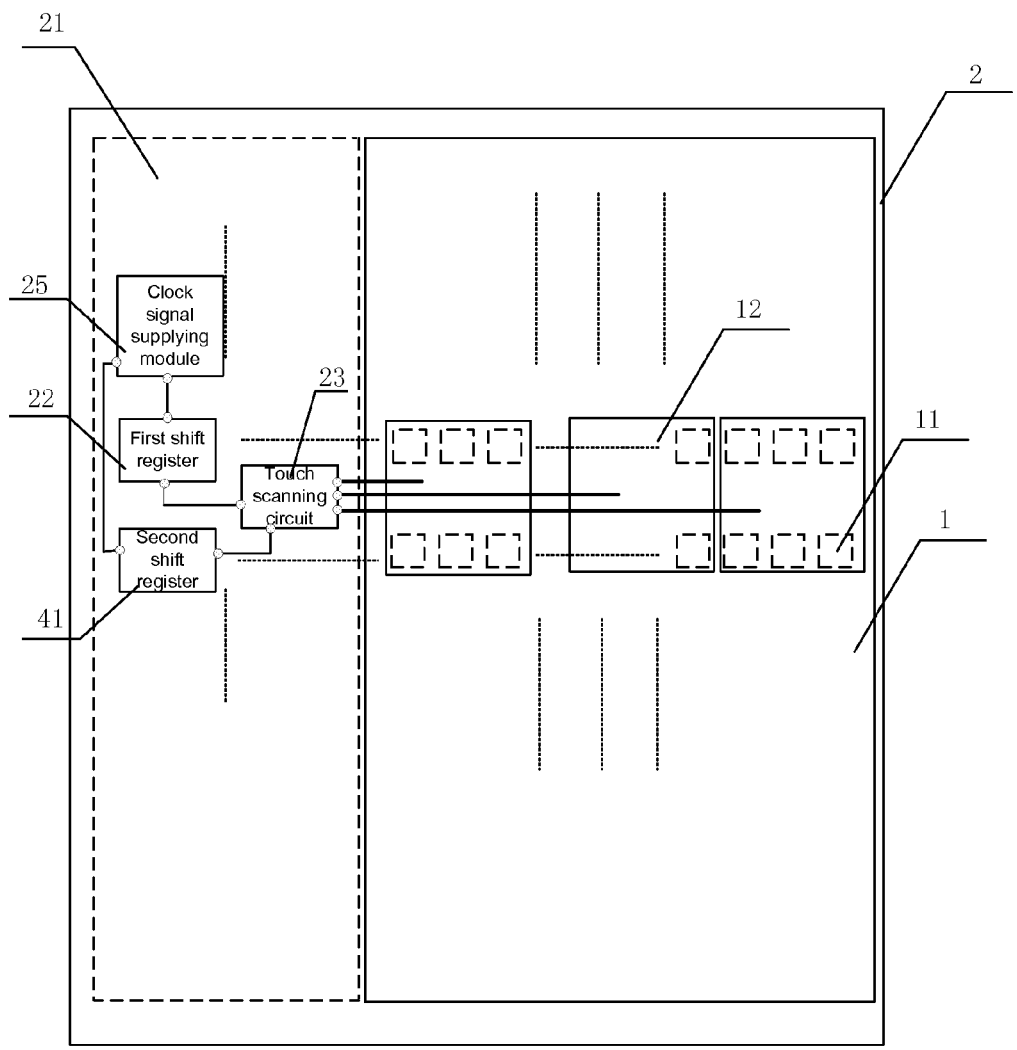
FIG. 8 is a schematic view showing a structure of a fourth instance of an array substrate, according to embodiments of the disclosure.

Also, the above-mentioned second shift register 41 also outputs the display scan signal in the frame scanning period and outputs the touch scan signal within the interval between frame scanning periods. Reference is made now to FIG. 8 which is a schematic view showing a structure of a fourth instance of an array substrate, according to embodiments of the disclosure. As shown in FIG. 8, the second shift register 41 is also connected with the clock signal supplying module 25. In the frame scanning period, the second shift register 41 is configured to generate a second display scan signal according to the first clock signal provided by the clock signal supplying module 25; and in the interval between frame scanning periods, the second shift register 41 is configured to generate a second touch scan signal according to the second clock signal provided by the clock signal supplying module 25.

Figure 9:
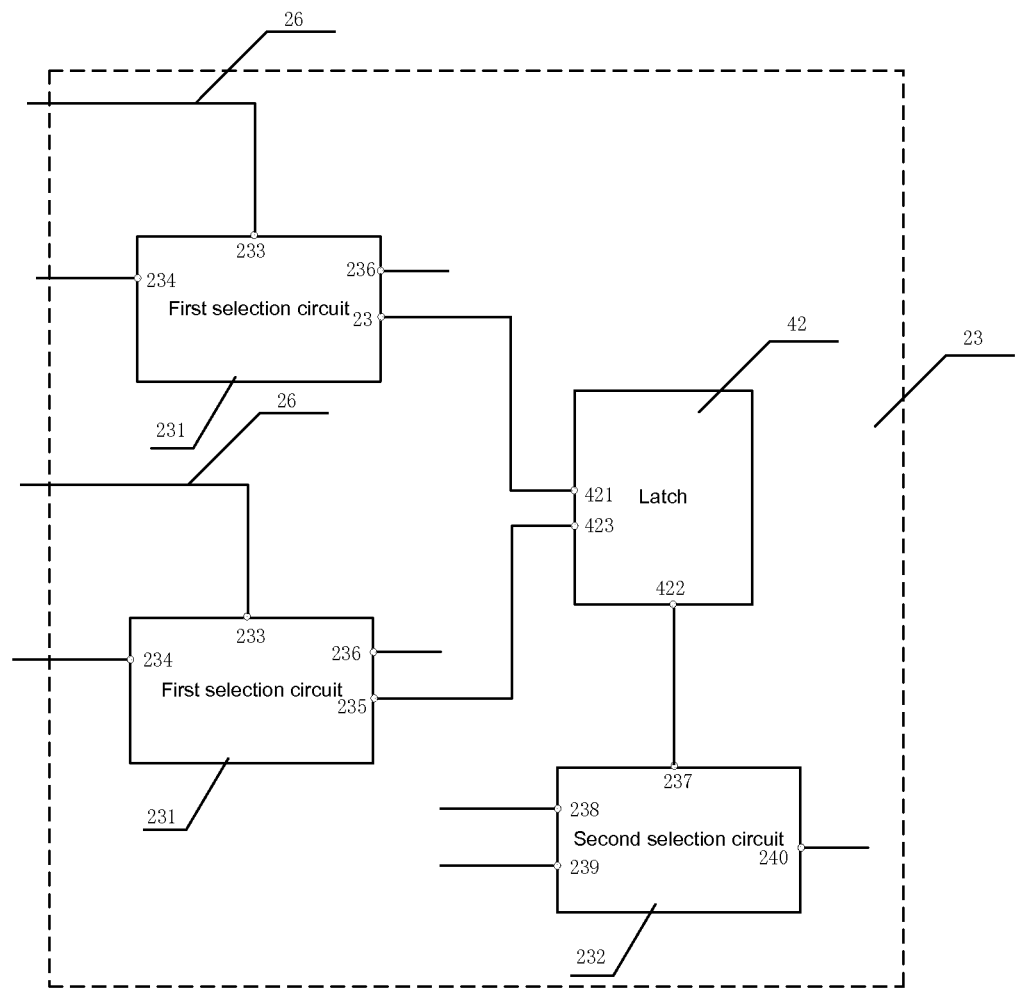
FIG. 9 is a schematic view showing a structure of the touch scanning circuit shown in FIG. 8, according to embodiments of the disclosure.

Reference is made to FIG. 9 which illustrates a schematic view showing a structure of the touch scanning circuit shown in FIG. 8, according to embodiments of the disclosure. As shown in FIG. 9, which is based on embodiments shown in FIG. 5, the touch scanning circuit further includes a first selection circuit 241 connected with the second shift register, and a latch 42.

A touch scan signal outputting terminal 235 of the first selection circuit 231 connected with the first shift register is connected with a first input terminal 421 of the latch 42, and an output terminal 422 of the latch 42 is connected with the second selection control terminal 237 of the second selection circuit 232.

A first selection control terminal 233 of the first selection circuit 241 connected with the second shift register is connected with the operating mode signal line 26, and the first scan signal inputting terminal 234 of the first selection circuit 241 connected with the second shift register is connected with the second scan signal outputting terminal of the second shift register. When receiving a display scan mode signal from the operating mode signal line 26, the first selection circuit 241 connected with the second shift register is configured to output, via the display scan signal outputting terminal 236 thereof, the second display scan signal received from the second scan signal outputting terminal of the second shift register, and when receiving a touch scan mode signal from the operating mode signal line 26, the first selection circuit 241 connected with the second shift register is configured to output, via the touch scan signal outputting terminal 235 thereof, the second touch scan signal received at the second scan signal inputting terminal. The touch scan signal outputting terminal 235 of the first selection circuit connected with the second shift register is connected with a second input terminal 423 of the latch 42.

The latch 42 is configured to output a first control signal to the second selection control terminal 237 of the second selection circuit through the output terminal 422 of the latch 42 within the time duration between receipt of the first touch scan signal at the first input terminal 421 and receipt of the second touch scan signal at the second input terminal 423, and to output a second control signal to the second selection control terminal 237 of the second selection circuit through the output terminal 422 of the latch 42 within other time durations.

The second selection circuit 232 is configured to output the touch signal received at the touch signal inputting terminal 239 via the first signal outputting terminal 240 when receiving the first control signal through the second selection control terminal 237, and to output the common voltage signal received at the common voltage signal inputting terminal 238 via the first signal outputting terminal 240 when receiving the second control signal through the second selection control terminal 237.

Figure 10:
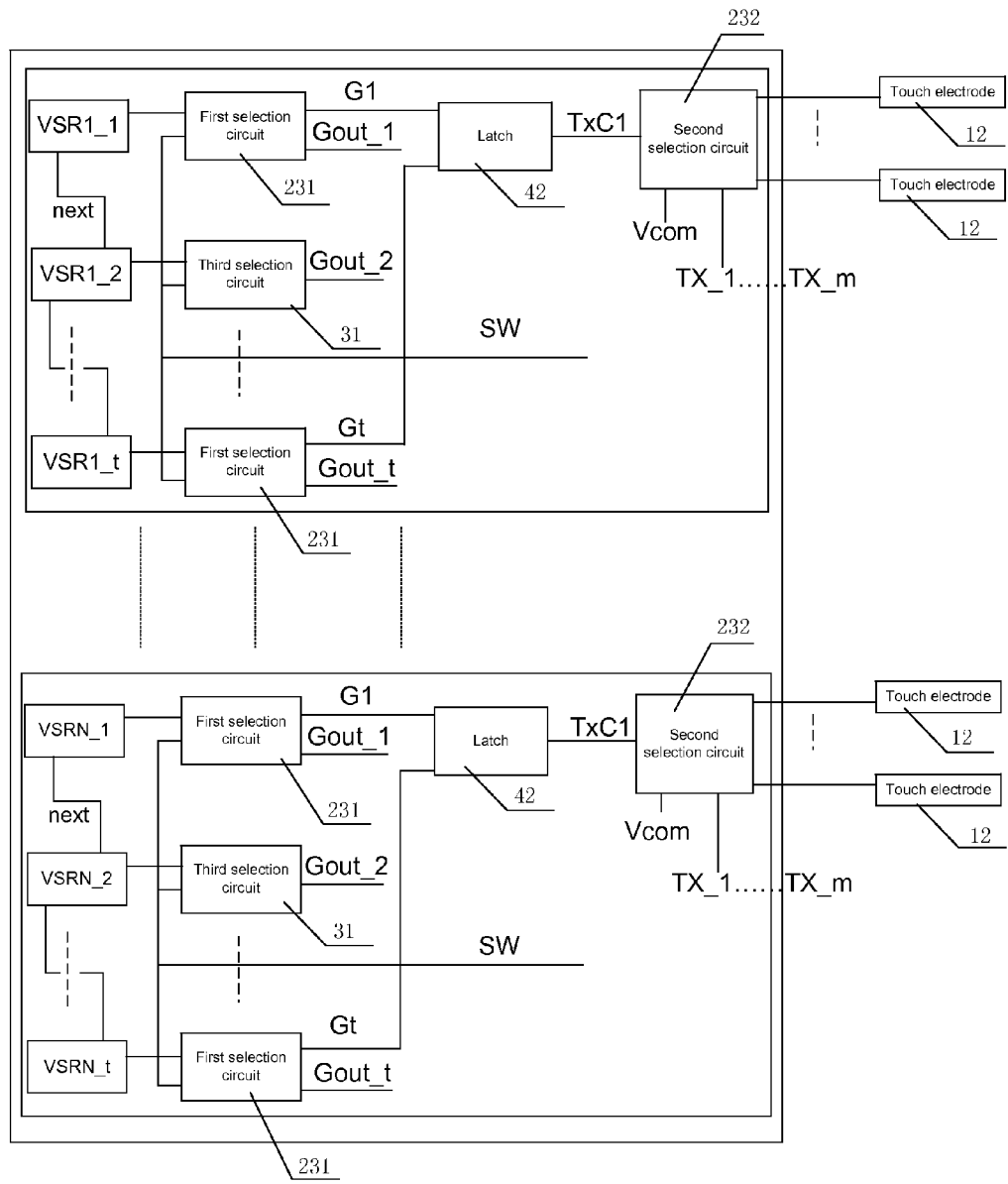
FIG. 10 is a schematic view showing a second correspondence relationship between shift registers and touch scanning circuits, according to embodiments of the disclosure.

FIG. 10 is a schematic view showing a second correspondence relationship between shift registers and touch scanning circuits, according to embodiments of the disclosure. As shown in FIG. 10, similar to embodiments shown in FIG. 6, the plurality of cascadedly-connected shift registers are divided into N groups of shift registers, where N is a positive integer. The first group of shift registers includes a number t of shift registers VSR1_1, VSR1_2, . . . , VSR1_t. The initial shift register VSR1_1, . . . , or VSRN_1 in each group of shift registers is configured as the above-described first shift register, and is connected with the first selection circuit 231. The ending shift register VSR1_t, . . . , or VSRN_t in each group of shift registers is configured as the above-described second shift register, and is also connected with the first selection circuit 241.

A third selection circuit 31 is provided for each of the shift registers in each group of shift registers except for the first shift register 22 and the second shift register 41. The latch 42 corresponding to the first group of shift registers is configured to generate the first control signal or the second control signal according to the first touch scan signal G1 from the first shift register VSR1_1 and the second touch scan signal Gt from the second shift register VSR1_t, and to output the first control signal or the second control signal (i.e., the signal TxC1) to the second selection circuit 232 through the output terminal of the latch 42. The second selection circuit 232 is configured to output the touch signals TX_1, TX_2, . . . , TX_m received at the touch signal inputting terminal to the touch electrodes 12 via from the first signal outputting terminal when receiving the first touch scan signal G1. Depending on the number m of the touch electrodes in each row of touch electrode, the first signal outputting terminal may include m ports, each of which corresponds to one touch electrode 12. The second selection circuit 232 is also configured to output the common voltage signal Vcom received at the common voltage signal inputting terminal to the touch electrodes 12 via the first signal outputting terminal when receiving the second control signal.

Circuit diagrams of the clock selection circuit, the first selection circuit, the second selection circuit, the latch and the third selection circuit in embodiments of the disclosure are illustrated below. These circuit diagrams are illustrative, and other circuit diagrams may be created by those skilled in the art according to the functions for the various circuits.

Figure 11:
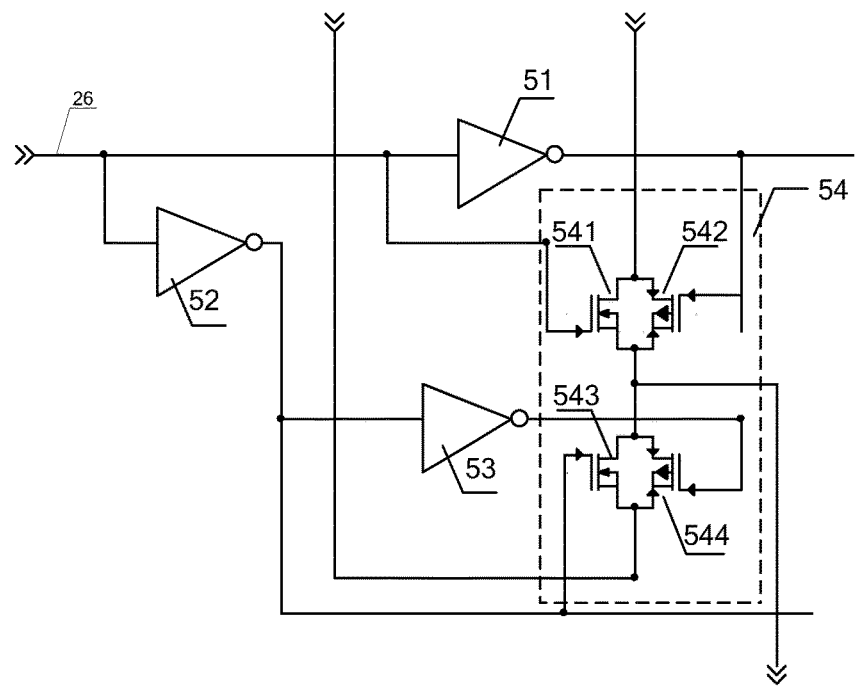
FIG. 11 is a schematic circuit diagram of a clock selection circuit, according to embodiments of the disclosure.

FIG. 11 is a schematic circuit diagram of a clock selection circuit, according to embodiments of the disclosure. As shown in FIG. 11, the clock selection circuit includes a first inverter 51, a second inverter 52, a third inverter 53, and a first set of transmission gates 54.

Both an input terminal of the first inverter 51 and an input terminal of the second inverter 52 are connected to the clock selection control terminal of the clock selection circuit, and an input terminal of the third inverter 53 is connected with an output terminal of the second inverter 52.

The first set of transmission gates 54 includes a first N-channel metal oxide semiconductor (NMOS) transistor 541, a first P-channel metal oxide semiconductor (PMOS) transistor 542, a second NMOS transistor 543 and a second PMOS transistor 544, where a gate electrode of the first NMOS transistor 541 is connected with the input terminal of the first inverter 51, a gate electrode of the first PMOS transistor 542 is connected with the output terminal of the first inverter 51, a drain electrode of the first NMOS transistor 541 and a source electrode of the first PMOS transistor 542 are connected with each other and both connected with the second clock signal inputting terminal of the clock selection circuit, a source electrode of the first NMOS electrode 541 and a drain electrode of the first PMOS transistor 542 are connected with each other and both connected with the clock signal outputting terminal of the clock selection circuit, a gate electrode of the second NMOS electrode 543 is connected with the output terminal of the second inverter 52, a gate electrode of the second PMOS electrode 544 is connected with the output terminal of the third inverter 53, a drain electrode of the second NMOS transistor 543 and a source electrode of the second PMOS transistor 544 are connected with each other and both connected with the first clock signal inputting terminal of the clock selection circuit, and a source electrode of the second NMOS transistor 543 and a drain electrode of the second PMOS transistor 544 are connected with each other and both connected with the clock signal outputting terminal of the corresponding clock selection circuit.

The clock selection circuit is equivalent to a 2-to-1 selector circuit, and the input terminal of the first inverter 51 is connected with the clock selection control terminal of the clock selection circuit, that is, the input terminal of the first inverter 51 is connected with the operating mode signal line 26. When a touch scan mode signal, e.g. a high level signal, is inputted from the operating mode signal line 26, the first NMOS transistor 541 and the first PMOS transistor 542 are turned on, so that the second clock signal inputting terminal and the clock signal outputting terminal of the clock selection circuit are connected, and hence the second clock signal is outputted by the clock selection circuit for operating in the touch phase. When a touch scan mode signal, e.g. a low level signal, is inputted from the operating mode signal line 26, the second NMOS transistor 543 and the second PMOS transistor 544 are turned on, so that the first clock signal inputting terminal and the clock signal outputting terminal of the clock selection circuit are connected, and hence the first clock signal is outputted by the clock selection circuit for operating in the display phase.

Figure 12:
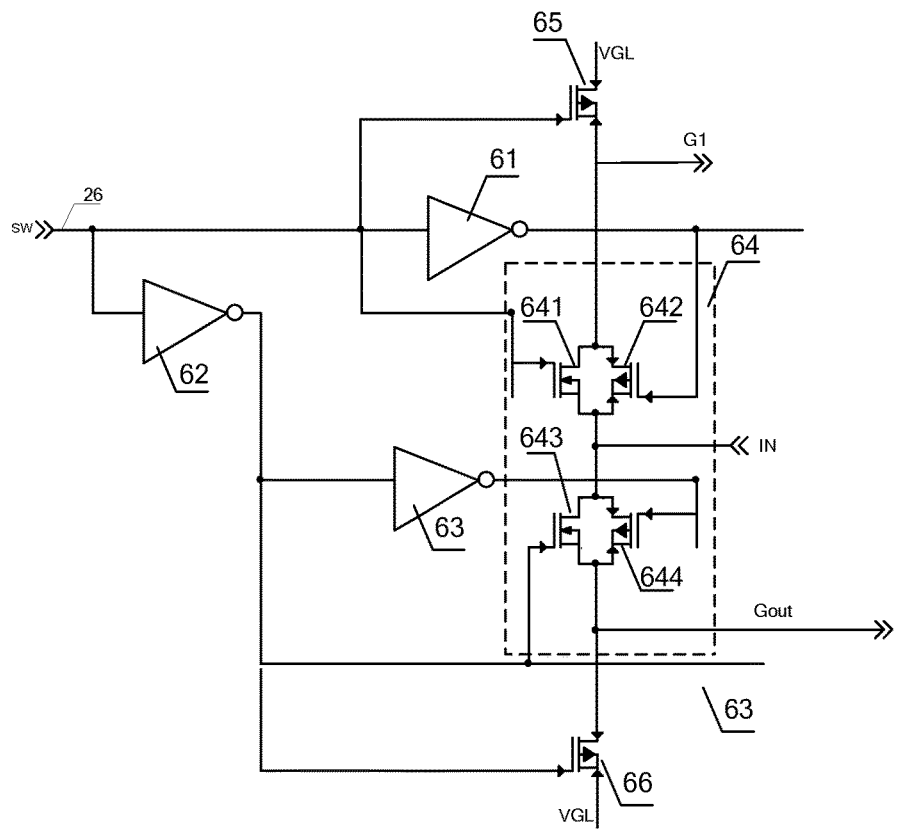
FIG. 12 is a schematic circuit diagram of a first selection circuit, according to embodiments of the disclosure.

FIG. 12 is a schematic circuit diagram of a first selection circuit, according to embodiments of the disclosure. Unlike the clock selection circuit shown in FIG. 11 which is equivalent to a 2-to-1 selector circuit, the first selection circuit shown in FIG. 12 is equivalent to a 1-to-2 selector circuit, which has one input terminal and two output terminals. As shown in FIG. 12, the first selection circuit includes a fourth inverter 61, a fifth inverter 62, a sixth inverter 63, a second set of transmission gates 64, a first pull-down PMOS transistor 65 and a second pull-down PMOS transistor 66.

An input terminal of the fourth inverter 61 is connected with the first selection control terminal of the first selection circuit, an input terminal of the fifth inverter 62 is connected with the first selection control terminal of the first selection circuit, and an input terminal of the sixth inverter 63 is connected with an output terminal of the fifth inverter 62.

The second set of transmission gates 64 includes a third NMOS transistor 641, a third PMOS transistor 642, a fourth NMOS transistor 643 and a fourth PMOS transistor 644, where a gate electrode of the third NMOS transistor 641 is connected with the input terminal of the fourth inverter 61, a gate electrode of the third PMOS transistor 642 is connected with the output terminal of the fourth inverter 61, a source electrode of the third NMOS transistor 641 and a drain electrode of the third PMOS transistor 642 are connected with each other and both connected with the touch scan signal outputting terminal of the first selection circuit, a drain electrode of the third NMOS transistor 641 and a source electrode of the third PMOS transistor 642 are connected with each other and both connected with the first scan signal inputting terminal of the first selection circuit, a gate electrode of the fourth NMOS transistor 643 is connected with the output terminal of the fifth inverter 62, a gate electrode of the fourth PMOS transistor 644 is connected with the output terminal of the sixth inverter 63, a drain electrode of the fourth NMOS transistor 643 and a source electrode of the fourth PMOS transistor 644 are connected with each other and both connected with the first scan signal inputting terminal of the first selection circuit, a source electrode of the fourth NMOS transistor 643 and a drain electrode of the fourth PMOS transistor 644 are connected with each other and both connected with the display scan signal outputting terminal of the first selection circuit.

A gate electrode of the first pull-down PMOS transistor 65 is connected with the first selection control terminal of the first selection circuit, a source electrode of the first pull-down PMOS transistor 65 is connected with the low-level signal line VGL, and a drain electrode of the first pull-down PMOS transistor 65 is connected with the touch scan signal outputting terminal of the first selection circuit.

A gate electrode of the second pull-down PMOS transistor 66 is connected with the output terminal of the fifth inverter 62, a source electrode of the second pull-down PMOS transistor 66 is connected with the low-level signal line VGL, and a drain electrode of the second pull-down PMOS transistor 66 is connected with the display scan signal outputting terminal of the first selection circuit.

The clock selection circuit is equivalent to a 1-to-2 selector circuit. The input terminal of the fourth inverter 61 is connected with the first selection control terminal of the first selection circuit, that is, the input terminal of the fourth inverter 61 is connected with the operating mode signal line 26. When a touch scan mode signal, e.g. a high level signal, is inputted through the operating mode signal line, the third NMOS transistor 641 and the third PMOS transistor 642 are turned on, so that the first scan signal inputting terminal and the touch scan signal outputting terminal of the first selection circuit are connected, and hence the first touch scan signal is outputted by the first selection circuit for operating in the touch phase; in this case, the display scan signal outputting terminal continues outputting a low-level signal due to the presence of the second pull-down PMOS transistor 66. When a touch scan mode signal, e.g. a low level signal, is inputted through the operating mode signal line 26, the fourth NMOS transistor 643 and the fourth PMOS transistor 644 are turned on, so that the first scan signal inputting terminal and the display scan signal outputting terminal of the first selection circuit are connected, and hence the first display scan signal is outputted by the first selection circuit for operating in the display phase; in this case, the touch scan signal outputting terminal continues outputting a low-level signal due to the presence of the first pull-down PMOS transistor 65. Table 1 is a truth table corresponding to the first selection circuit, where SW represents the input signal to the first selection control terminal, IN represents the input signal to the first scan signal inputting terminal, G1 represents the output signal from the touch scan signal outputting terminal, and Gout represents the output signal outputted from the display scan signal outputting terminal.

TABLE 1

Truth Table

| | SW | IN | G1 | Gout |
|---|---|---|---|---|
| Levels | H | H | H | L |
| | H | L | L | L |
| | L | H | L | H |
| | L | L | L | L |

Figure 13:
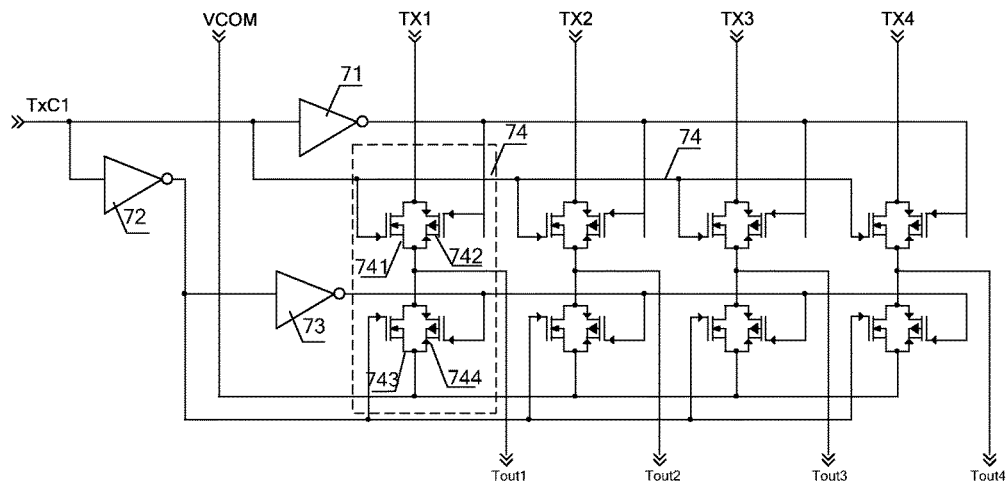
FIG. 13 is a schematic circuit diagram of a second selection circuit, according to embodiments of the disclosure.

FIG. 13 is a schematic circuit diagram of a second selection circuit, according to embodiments of the disclosure. As shown in FIG. 13, the second selection circuit includes a seventh inverter 71, an eighth inverter 72, a ninth inverter 73, and a third set of transmission gates 74.

An input terminal of the seventh inverter 71 is connected with the second selection control terminal of the second selection circuit, an input terminal of the eighth inverter 72 is connected with the second selection control terminal of the second selection circuit, and the input terminal of the ninth inverter 73 is connected with an output terminal of the eighth inverter 72.

The third set of transmission gates 74 includes a fifth NMOS transistor 741, a fifth PMOS transistor 742, a sixth NMOS transistor 743 and a sixth PMOS transistor 744, where a gate electrode of the fifth NMOS transistor 741 is connected with the input terminal of the seventh inverter 71, a gate electrode of the fifth PMOS transistor 742 is connected with the output terminal of the seventh inverter 71, a drain electrode of the fifth NMOS transistor 741 and a source electrode of the fifth PMOS transistor 742 are connected with each other and both connected with the touch signal inputting terminal of the second selection circuit, a source electrode of the fifth NMOS electrode 741 and a drain electrode of the fifth PMOS transistor 742 are connected with each other and both connected with the first signal outputting terminal of the second selection circuit, a gate electrode of the sixth NMOS electrode 743 is connected with the output terminal of the eighth inverter 72, a gate electrode of the sixth PMOS electrode 744 is connected with the output terminal of the ninth inverter 73, a drain electrode of the sixth NMOS transistor 743 and a source electrode of the sixth PMOS transistor 744 are connected with each other and both connected with the first signal outputting terminal of the second selection circuit, and a source electrode of the sixth NMOS transistor 743 and a drain electrode of the sixth PMOS transistor 744 are connected with each other and both connected with the common voltage signal inputting terminal of the second selection circuit. The number of the third sets of transmission gates complies with the number of the touch electrodes in each row of touch electrodes. In FIG. 13, illustratively, each row of touch electrodes includes four touch electrodes, and hence four third sets of transmission gates, which have the same circuit diagram and connection relationship, are provided in the second selection circuit.

The second selection circuit is equivalent to a 2-to-1 selector circuit. The input terminal of the seventh inverter 71 is connected with the second selection control terminal of the second selection circuit. When a high-level signal is inputted through the second selection control terminal, the fifth NMOS transistor 741 and the fifth PMOS transistor 742 are turned on, so that the touch signal inputting terminal and the first signal outputting terminal of the second selection circuit are connected, and hence the touch signal is outputted by the second selection circuit for operating in the touch phase. When a low-level signal is inputted through the second selection control terminal, the sixth NMOS transistor 743 and the sixth PMOS transistor 744 are turned on, so that the common voltage signal inputting terminal and the first signal outputting terminal of the second selection circuit are connected, and hence the common voltage signal is outputted by the second selection circuit for operating in the display phase.

Figure 14:
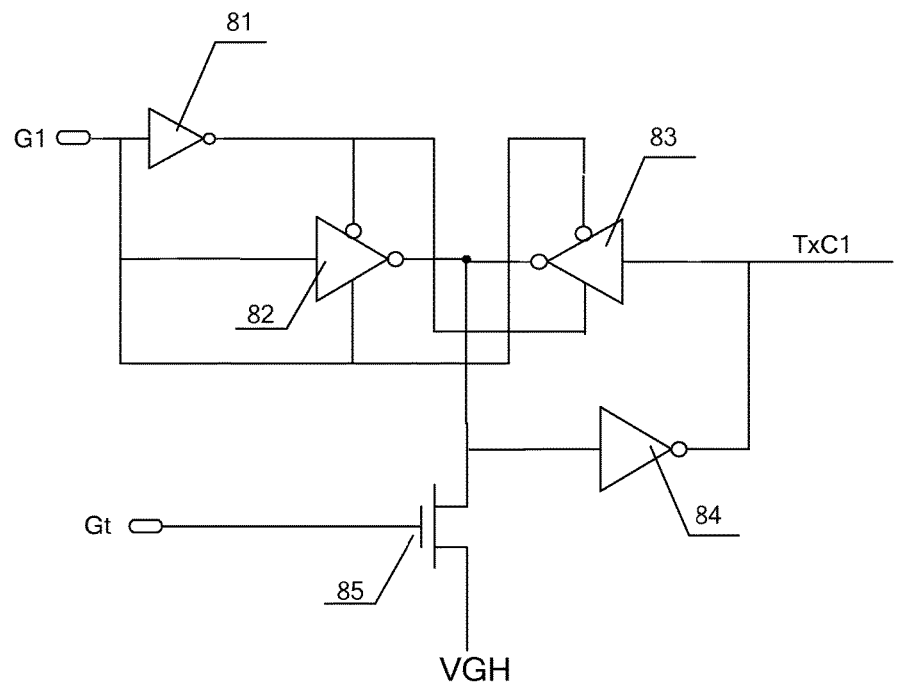
FIG. 14 is a schematic circuit diagram of a latch, according to embodiments of the disclosure.

FIG. 14 is a schematic circuit diagram of a latch, according to embodiments of the disclosure. As shown in FIG. 14, the latch includes a tenth inverter 81, a first clock inverter 82, a second clock inverter 83, an eleventh inverter 84 and a first thin film transistor 85, where an input terminal of the tenth inverter 81 is connected with the first input terminal of the latch, and an output terminal of the tenth inverter 81 is connected to a first control terminal of the first clock inverter 82 and a second control terminal of the second clock inverter 83.

Both an input terminal and a second control terminal of the first clock inverter 82 are connected with the first input terminal of the latch, and an output terminal of the first clock inverter 82 is connected with an output terminal of the second clock inverter 83.

A first control terminal of the second clock inverter 83 is connected with the first input terminal of the latch, and an input terminal of the second clock inverter 83 is connected with an output terminal of the eleventh inverter 84.

An input terminal of the eleventh inverter 84 is connected with an output terminal of the first thin film transistor 85, and the output terminal of the eleventh inverter 84 is connected with the output terminal of the latch.

A gate electrode of the first thin film transistor 85 is connected with the second input terminal of the latch, and an input terminal of the first thin film transistor 85 is connected with a high-level signal inputting terminal VGH. Herein, the first thin film transistor 85 may be an N-type thin film transistor which is turned on by a high-level signal.

The latch in the present embodiment is suitable for the case that the touch scanning circuit is connected with both the first shift register and the second shift register and includes two first selection circuits respectively corresponding to the first shift register and the second shift register, as shown in FIG. 5. Both the input terminal of the tenth inverter 81 and the input terminal of the first clock inverter 82 are connected with the first input terminal of the latch, and hence are connected with the touch scan signal outputting terminal of the first shift register. In addition, the input terminal of the eleventh inverter 84 of the latch is connected with the output terminal of the first thin film transistor 85, and a gate electrode of the first thin film transistor 85 is connected with the second input terminal of the latch and hence is connected with the touch scan signal outputting terminal of the second shift register.

Considering that the two different shift registers, which are respectively connected to the first and second input terminals of the latch, are not allowed to simultaneously output a touch scan signal, it will not happen that the first input terminal and the second input terminal of the latch are applied with a high-level signal simultaneously. When a touch scan signal G1 is outputted by the first shift register and thus the first input terminal of the latch is applied with a high level signal, a low-level signal is outputted from the first clock inverter 82 to pull down the potential at the input terminal of the eleventh inverter 84, so that the eleventh inverter 84 starts outputting a high-level signal; subsequently, when the first shift register stops outputting the first touch scan signal G1 and a low-level signal is inputted to the first input terminal of the latch, the second clock inverter 83 is turned on and interacts with the eleventh inverter 84 to place the latch in a latched state, so that the latch continuously outputs the high-level signal. When the second shift register starts outputting the touch scan signal Gt, that is, the gate electrode of the first thin film transistor 85 is applied with a high-level signal, the first thin film transistor 85 is turned on so that the high-level signal VGH is received from the high-level signal inputting terminal, to pull up the potential at the input terminal of the eleventh inverter 84, and thus the eleventh inverter 84 starts outputting a low-level signal; then subsequently, the second shift register stops outputting the touch scan signal Gt, so that the latch is placed in the latched state and continuously outputs the low-level signal. In embodiments, the high-level signal is used as the first control signal outputted by the latch, the low-level signal is used as the second control signal outputted by the latch. In this case, if H represents a high-level signal and L represents the low-level signal, the truth table 2 listing the first touch scan signal G1, the second touch scan signal Gt and an output signal TxC1 from the latch is as follows:

TABLE 2

| | | | |
|---|---|---|---|
| | Truth table | | |
| | G1 | Gt | TxC1 |
| Levels | H | H | Not Allowable |
| | H | L | H |
| | L | H | L |
| | L | L | Latched State |

Figure 15:
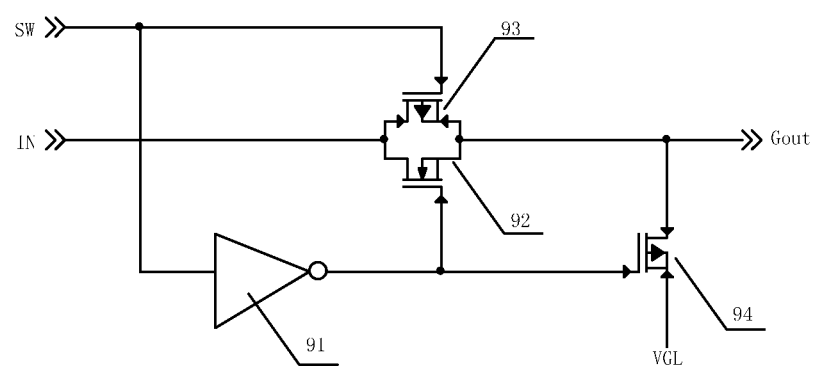
FIG. 15 is a schematic circuit diagram of a third selection circuit, according to embodiments of the disclosure.

FIG. 15 is a schematic circuit diagram of a third selection circuit, according to embodiments of the disclosure. As shown in FIG. 15, the third selection circuit includes a twelfth inverter 91, a seventh NMOS transistor 92, a seventh PMOS transistor 93 and an eighth PMOS transistor 94.

An input terminal of the twelfth inverter 91 is connected with a gate electrode of the seventh PMOS transistor 93 and is also connected with a third selection control terminal of the third selection circuit.

An output terminal of the twelfth inverter 91 is connected with a gate electrode of the seventh NMOS transistor 92.

A drain electrode of the seventh PMOS transistor 93 is connected with a drain electrode of the seventh NMOS transistor 92 and is also connected with a signal inputting terminal IN of the third selection circuit, and a source electrode of the seventh PMOS transistor 93 is connected with a source electrode of the seventh NMOS transistor 92 and is also connected with a signal outputting terminal Gout of the third selection circuit.

A gate electrode of the eighth PMOS transistor 94 is connected with an output terminal of the twelfth inverter 91, a drain electrode of the eighth PMOS transistor 94 is connected with the signal outputting terminal Gout of the third selection circuit, and a source electrode of the eighth PMOS transistor 94 is connected with the low-level signal line VGL.

In embodiments, the input terminal of the twelfth inverter 91 is connected with the selection control terminal of the third selection circuit, and is also connected with the operating mode signal line configured for inputting an operating mode signal SW. When a touch scan mode signal, which is a high level signal, is inputted by the operating mode signal line, the seventh NMOS transistor 92 and the seventh PMOS transistor 93 are turned off and the eighth PMOS 94 transistor is turned on, so that a low-level signal is continuously outputted by the signal outputting terminal Gout of the third selection circuit to turn off the pixel units connected with the signal outputting terminal Gout of the third selection circuit, thereby reducing the impact on the pixel units in the touch phase. When a touch scan mode signal, which is a low level signal, is inputted by the operating mode signal line, the seventh NMOS transistor 92 and the seventh PMOS transistor 93 are turned on and the eighth PMOS 94 transistor is turned off, so that the signal outputted from the signal outputting terminal Gout of the third selection circuit varies with the signal inputted to the signal outputting terminal IN of the third selection circuit. In this case, if H represents a high-level signal and L represents a low-level signal, the Truth table 3 is as follows:

TABLE 3

| | Truth table | | |
|---|---|---|---|
| | SW | IN | Gout |
| Levels | H | H | L |
| | H | L | L |
| | L | H | H |
| | L | L | L |

Figure 16:
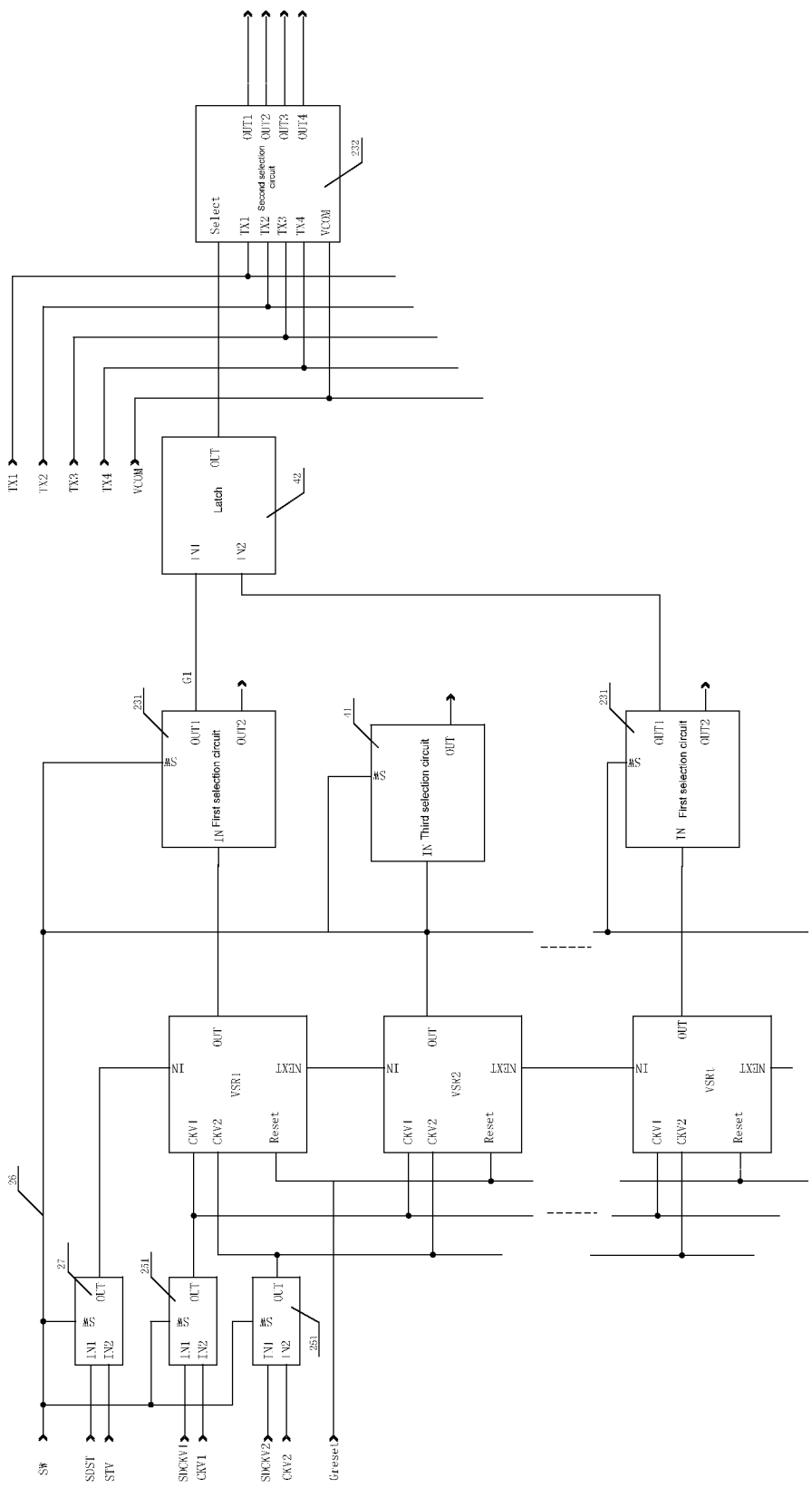
FIG. 16 is a schematic view showing a specific structure of a driver circuit, according to embodiments of the disclosure.

FIG. 16 is a schematic view showing a specific structure of a driver circuit, according to embodiments of the disclosure. As shown in FIG. 16, the driver circuit includes two clock selection circuits 251, selection control terminals SW of both of which are connected with the operating mode signal line 26, first input terminals IN1 of which are respectively connected with clock signal lines SDCKV1 and SDCKV2 for the touch phase, second input terminals IN2 of which are respectively connected with clock signal lines CKV1 and CKV2 for the touch phase, and output terminals OUT of which each are connected with shift registers VSR1, VSR2, . . . , VSRt.

The driver circuit further includes a trigger signal selection circuit 27, a selection control terminal SW of which is connected with the operating mode signal line 26, a first input terminal IN1 of which is connected with a touch trigger signal line SDST, a second input terminal IN2 of which is connected with a scan trigger signal line STV, and an output terminal OUT of which is connected with a trigger signal inputting terminal IN of the initial shift register VSR1 from the cascaded-connected shift registers VSR1, VSR2, . . . , VSRt, and the trigger signal inputting terminal IN of each of the remaining shift registers VSR2, . . . , VSRt except for the initial shift register VSR1 is connected with a trigger signal outputting terminal NEXT of the immediately preceding shift register. The trigger signal selection circuit is configured to output a display trigger signal when a display scan mode signal is inputted from the operating mode signal line 26, and to output a touch trigger signal when a touch scan mode signal is inputted from the operating mode signal line 26.

Also, the diver circuit includes a reset signal line Greset connected with a reset signal terminal Reset of each of the shift registers VSR1, VSR2, . . . , VSRt, and the reset signal line Greset is configured for inputting a reset signal to reset the shift registers.

Each of the shift registers VSR1, VSR2, . . . , VSRt includes two clock signal inputting terminals CKV1 and CKV2. In the frame display operating mode, each shift register generates a display scan signal and outputs the display scan signal via the output terminal OUT of the shift register. The output terminals OUT of the initial shift register and the ending shift register from each group of shift registers VSR1, VSR2, . . . , VSRt are connected with the input terminals IN of the first selection circuits 231 and 241, and the output terminal OUT of each of the remaining shift registers VSR2, . . . , VSRt-1 except for the initial shift register and the ending shift register is connected with the input terminal IN of a third selection circuit 41. The selection control terminals SW of the first selection circuits 231 and 241 and the third selection circuits 41 are connected with the operating mode signal line 26. When a display scan mode signal is supplied by the operating mode signal line 26, each shift register generates the display scan signal according to the clock signal, where the initial shift register VSR1 and the ending shift register VSRt output their generated display scan signals to the first selection circuits 231 and 241, and the first selection circuits 231 and 241 in turn transmit the display scan signals from the initial shift register VSR1 and the ending shift register VSRt to the scan lines via the second output terminals OUT2 thereof, while the remaining shift registers VSR2, . . . , VSRt-1 except for the initial shift register and the ending shift register output their generated display scan signals to the third selection circuits 41, and the third selection circuits 41 in turn transmit the display scan signals from the shift registers VSR2, . . . , VSRt-1 to the scan lines via the output terminals OUT of the third selection circuits 41.

When a touch scan mode signal is supplied by the operating mode signal line 26, the initial shift register VSR1 generates a first touch scan signal according to the clock signal, and outputs the generated first touch scan signal to the first selection circuit 231 connected to the initial shift register VSR1. Then the first selection circuit 231 connected the initial shift register VSR1 transmits the first touch scan signal G1 to the first input terminal IN1 of the latch 42 through the touch signal outputting terminal OUT1 of the first selection circuit 231, so that the latch 42 starts to output a first control signal to the second selection control terminal Select of the second selection circuit 232 through the output terminal OUT of the latch 42. Subsequently, the ending shift register VSRt generates a second touch scan signal according to the clock signal, and outputs the generated second touch scan signal to the first selection circuit 241 connected to the ending shift register VSRt. Then the first selection circuit 241 connected the ending shift register VSRt transmits the second touch scan signal Gt to the second input terminal IN2 of the latch 42 through the touch signal outputting terminal OUT1 of the first selection circuit 241 connected the ending shift register VSRt, so that the latch 42 stops outputting the first control signal after receiving the second touch scan signal Gt, and starts to output the second control signal.

In embodiments, illustratively, each row of touch electrodes includes four touch electrodes. The touch signal inputting terminal of the second selection circuit 232 includes four ports used for receiving four touch signals TX1, TX2, TX3 and TX4, which correspond to the touch electrodes, respectively. The common signal inputting terminal of the second selection circuit is configured to receive the common voltage signal Vcom. The second selection circuit 232 is configured to output the four touch signals to the corresponding touch electrodes through the signal outputting terminals OUT1, OUT2, OUT3 and OUT4 when receiving the first control signal, and to output the common voltage signal Vcom to the four touch electrodes when receiving the second control signal.

The driver circuit of the array substrate according to embodiments of the disclosure may be designed in two design manners. In one of the design manners, the shift registers of the driver circuit are all disposed in the non-display region on a peripheral side of the array substrate. In the other of the design manners, the shift registers of the driver circuit are disposed in the non-display region on two peripheral sides of the array substrate. For example, the shift registers for driving even-numbered rows of pixel units are disposed in the non-display region on a first peripheral side of the array substrate, while the shift registers for driving odd-numbered rows of pixel units are disposed in the non-display region on a second peripheral side of the array substrate.

Figure 17A:
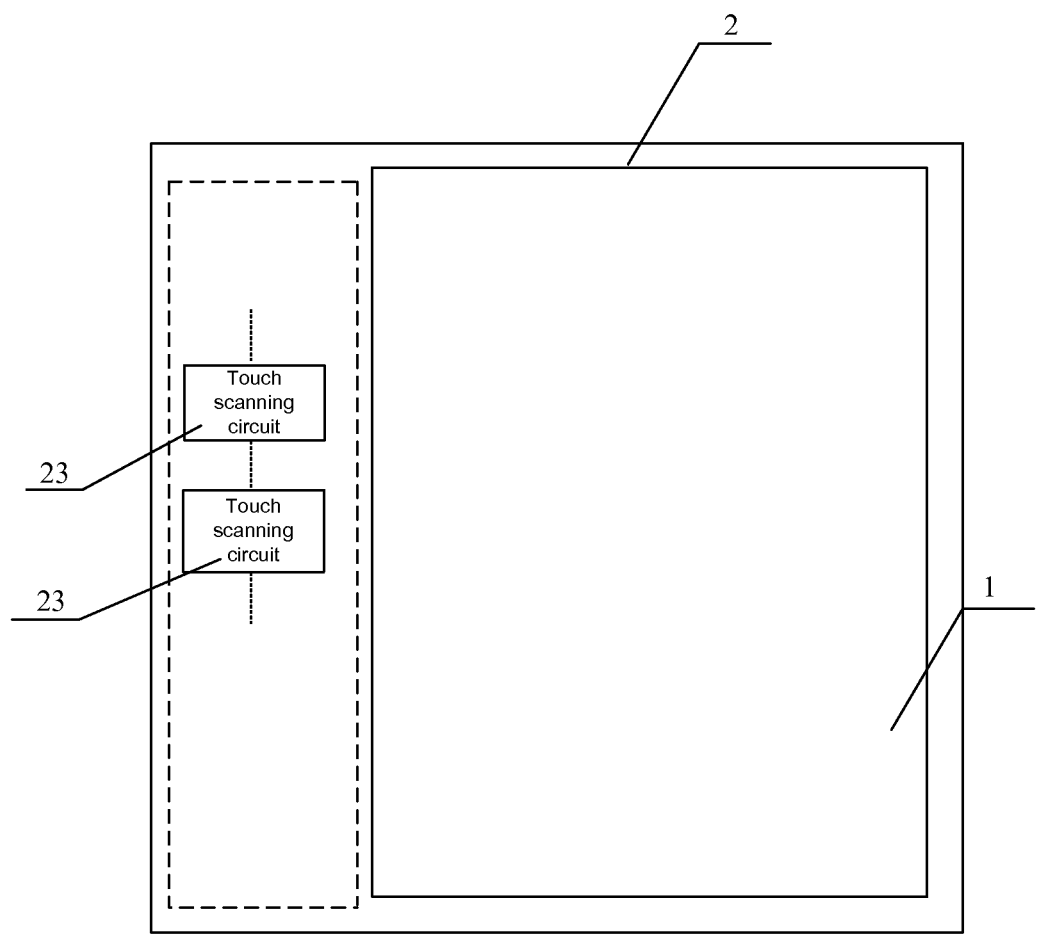
FIG. 17A is a schematic view showing a first position relationship between shift registers and touch scanning circuits, according to embodiments of the disclosure.

In FIG. 6, for example, the shift registers are divided into groups, with each group of shift registers corresponding to one touch scanning circuit, thus the driver circuit includes at least two touch scanning circuits. In this case, the at least two touch scanning circuits may be disposed in the non-display region on a first peripheral side of the array substrate as shown in FIG. 17A, or may be disposed in the non-display region on the second peripheral side of the array substrate as shown in FIG. 17B, or may be disposed in the non-display region on the first peripheral side of the array substrate and in the non-display region on the second peripheral side of the array substrate as shown in FIG. 17C.

Figure 17B:
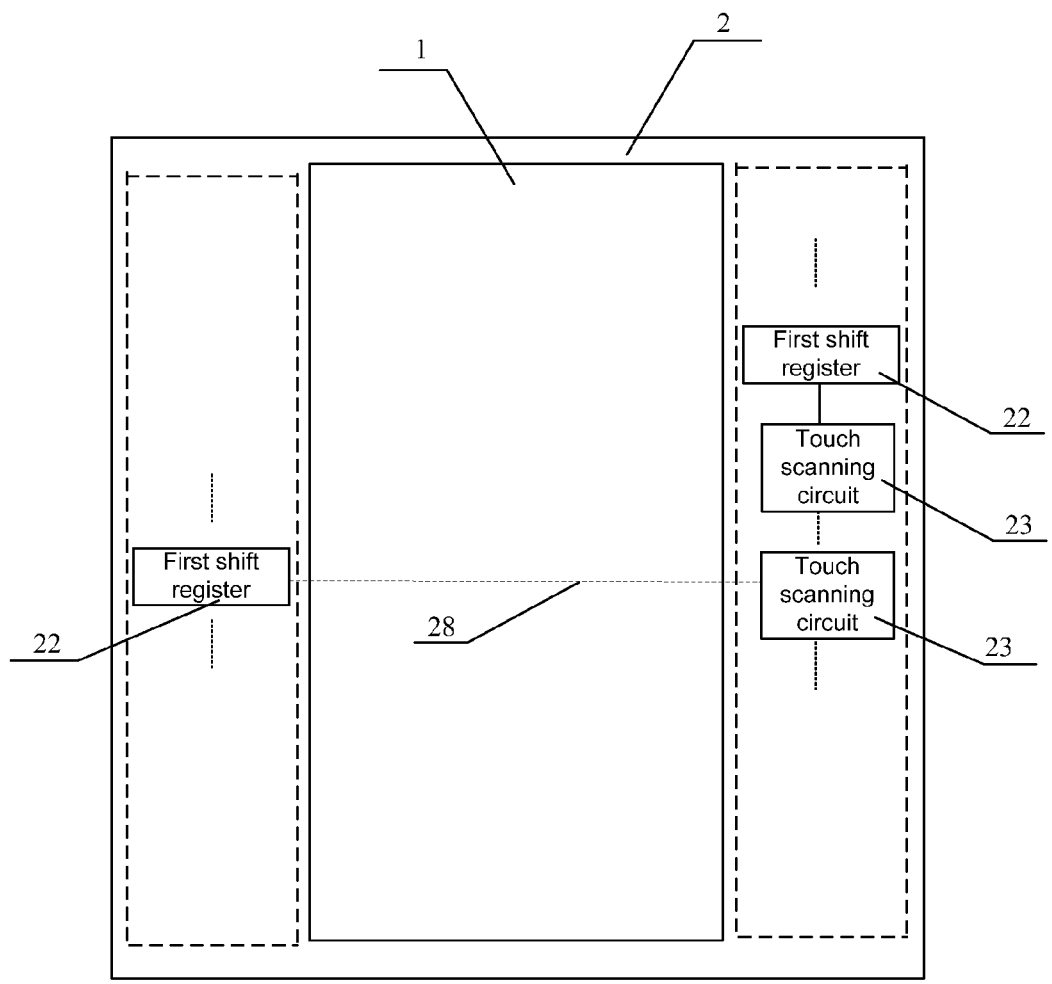
FIG. 17B is a schematic view showing a second position relationship between shift registers and touch scanning circuits, according to embodiments of the disclosure.
Figure 17C:
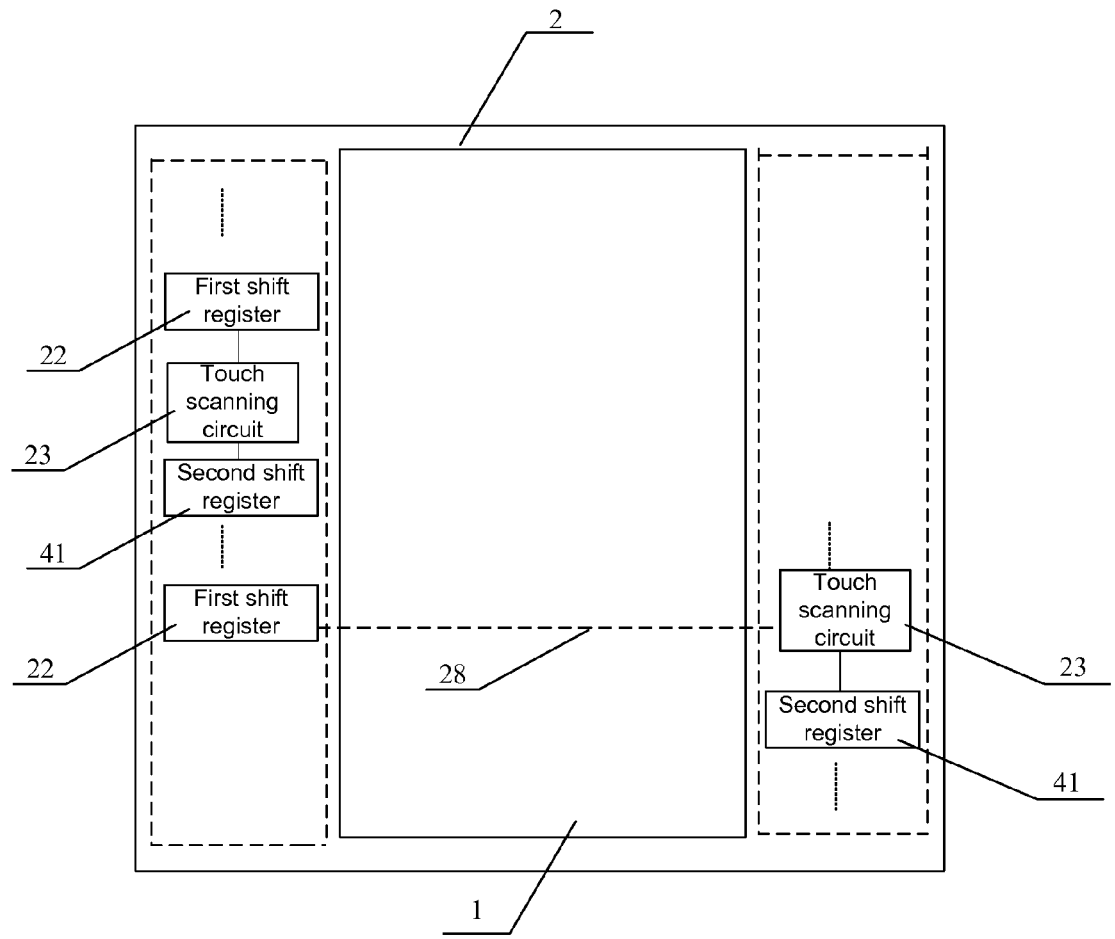
FIG. 17C is a schematic view showing a third position relationship between shift registers and touch scanning circuits, according to embodiments of the disclosure.

Furthermore, in the case that the touch scanning circuit 23 and the first shift register 22 connected with the touch scanning circuit 23 are located in the non-display region on different peripheral sides of the array substrate, as shown in FIG. 17B, the first shift register 22 is connected with the touch scanning circuit 23 through a conductive wiring 28 running through the display region of the array substrate. Or, in the case that the touch scanning circuit 23 and the second shift register 41 connected with the touch scanning circuit 23 are located in the non-display region on different sides of the array substrate, the second shift register 41 is connected with the touch scanning circuit 23 through a conductive wiring 28 running through the display region of the array substrate.

Embodiments of the disclosure also provide a touch display panel, including a color filter substrate, an array substrate according to any of the above embodiments, and a driver chip which is connected with the driver circuit on the array substrate.

Figure 18:
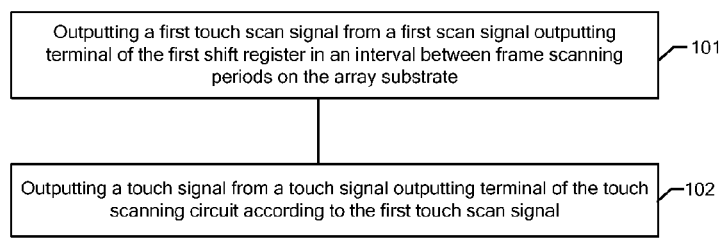
FIG. 18 is a flow chart showing a driving method for an array substrate, according to embodiments of the disclosure.

Embodiments of the disclosure also provide a driving method for an array substrate. FIG. 18 is a flow chart showing a driving method for an array substrate, according to embodiments of the disclosure, where the array substrate includes a display region and a non-display region surrounding the display region, pixel units arranged in an array are disposed in the display region, a driver circuit is disposed in the non-display region, and the driver circuit includes a first shift register and a touch scanning circuit corresponding to the first shift register. As shown in FIG. 18, the driving method includes:

Step 101 of outputting a first touch scan signal from a first scan signal outputting terminal of the first shift register in an interval between frame scanning periods of the array substrate; and Step 102 of outputting a touch signal from a touch signal outputting terminal of the touch scanning circuit according to the first touch scan signal.

In the driving method, the first shift register is reused, so that the first shift register outputs the first touch scan signal to the touch scanning circuit in an interval between frame scanning periods to enable the touch scanning circuit to output the touch signal from a touch signal outputting terminal thereof according to the first touch scan signal, and the first shift register also outputs a display scan signal in the frame scanning period. Thus, in the technical solutions provided by embodiments of the disclosure, the first shift register is reused in the frame scanning period and the interval between frame scanning periods, so that the provision of dedicated shift registers for the touch phase between frame scanning periods is eliminated. In this case, the number of the circuit elements in the non-display region of the array substrate is effectively reduced, so that the layout area occupied by the driver circuit in the non-display region is decreased, thereby reducing the width of the non-display region, satisfying the requirement for frame narrowing.

Also, since the first shift register operates in both the frame scanning period and the interval between frame scanning periods, the first shift register is required to output different scan signals and hence selectively requires for appropriate clock drive signals. Referring to FIG. 3, the driver circuit in the array substrate further includes a clock signal supplying module 25 connected with the first shift register. Thus, when operating in the frame scanning process, the first shift register can generate a first display scan signal according to the first clock signal provided by the clock signal supplying module 25; while in the interval between frame scanning processes, the first shift register can generate a first touch scan signal according to the second clock signal provided by the clock signal supplying module 25. In the present disclosure, the frame scanning process refers to a period for displaying an image frame, and hence is also called as display phase, while the interval between frame scanning processes refers to a period of performing a touch scanning operation, and hence is also called as touch phase.

Referring to FIG. 5, in embodiments, the touch scanning circuit includes a first selection circuit and a second selection circuit, where the first selection circuit connected with the first shift register is configured to output, via the display scan signal outputting terminal of the first selection circuit connected with the first shift register, the first display scan signal received at the first scan signal inputting terminal when receiving a display scan mode signal through the operating mode signal line, and to output, via the touch scan signal outputting terminal of the first selection circuit connected with the first shift register, the first touch scan signal received at the first scan signal inputting terminal when receiving a touch scan mode signal through the operating mode signal line.

The second selection circuit is configured to output, via the first signal outputting terminal, the touch signal received at the touch signal inputting terminal, or to output, via the first signal outputting terminal, the common voltage signal received at the common voltage signal inputting terminal, depending on types of the signals received at the second selection control terminal.

Figure 19:
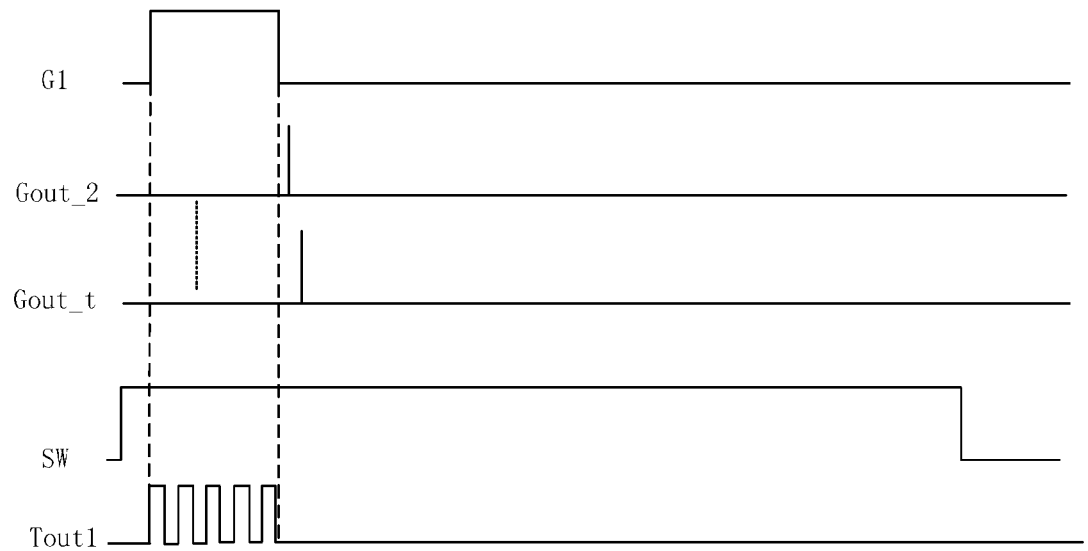
FIG. 19 is a timing diagram of a first driving method, according to embodiments of the disclosure.

In FIG. 6, the touch scan signal outputting terminal of the first selection circuit is in direct connection with the second selection control terminal of the second selection circuit, and the second selection circuit is configured to output the touch signal received at the touch signal inputting terminal via the first signal outputting terminal when receiving the first touch scan signal, or otherwise to output the common voltage signal received at the common voltage signal inputting terminal via the first signal outputting terminal in other time periods. FIG. 19 is a timing diagram of a first driving method, according to embodiments of the disclosure. As shown in FIG. 19, in the time interval between frame scanning periods, a high-level signal is outputted from the operating mode signal line SW, and the array substrate operates in the touch phase, so that the first shift register VSR1_1 generates and outputs the first touch scan signal G1 to the first selection circuit 241 connected with the first shift register VSR1_1, and the first selection circuit 241 outputs the first touch scan signal G1 to the second selection circuit, which in turn outputs touch signals Tout in the time period of receiving the first touch scan signal G1 to the respective touch electrodes. In the case of presence of m touch electrodes in each row of touch electrode, the touch signals Tout include m touch signals Tout1-Toutm.

Also, in the interval between frame scanning periods, for each group of shift registers, the time duration of the first touch scan signal generated by the initial shift register from the group of shift registers according to the second clock signal provided by the clock signal supplying module is longer than the time duration of the touch scan signals generated by the remaining shift registers from the group of shift registers except for the initial shift register. As shown in FIG. 19, the time duration of the first touch scan signal G1 generated by the initial shift register VSR1_1 is much longer than the time duration of the touch scan signals generated by the remaining shift registers. Illustratively, only one group of shift registers is described in the embodiment shown in FIG. 19, but more than one group of shift registers may be provided in order to generate the touch scan signals in the interval between frame scanning periods according to the above driving method.

Further, referring to FIG. 7, the driver circuit further includes a second shift register 41, where the second shift register 41 is configured to output a second touch scan signal through a second scan signal outputting terminal of the second shift register in the time interval between frame scanning periods of the array substrate. Differing from the configuration of the above touch scanning circuit which is configured to output the touch signal based on only the first touch scan signal, the touch scanning circuit shown in FIG. 7 is configured to output the touch signal from the touch signal outputting terminal based on the first touch scan signal and the second touch scan signal.

Referring to FIG. 8, the second shift register 41 is likewise connected with the clock signal supplying module 25, and similar to the first shift register 22, the second shift register 41 is likewise configured to generate the second touch scan signal in the time interval between frame scanning periods according to the second clock signal provided by the clock signal supplying module 25, and to generate the second display scan signal in the frame scanning period according to the first clock signal provided by the clock signal supplying module 25.

Referring to FIGS. 9 and 10, in embodiments, the touch scanning circuit further includes a first selection circuit 241 connected with the second shift register 41, and a latch 42. A touch scan signal outputting terminal of the first selection circuit 231 connected with the first shift register 22 is connected with a first input terminal 421 of the latch 42, a touch scan signal outputting terminal of the first selection circuit 241 connected with the second shift register 41 is connected with a second input terminal 423 of the latch 42, and an output terminal 422 of the latch 42 is connected with the second selection control terminal 247 of the second selection circuit 24. The driving method further includes that:

the first selection circuit connected with the second shift register outputs the second display scan signal via the display scan signal outputting terminal of the first selection circuit connected with the second shift register when receiving a display scan mode signal from the operating mode signal line, and outputs the second touch scan signal via the touch scan signal outputting terminal of the first selection circuit connected with the second shift register when receiving a touch scan mode signal from the operating mode signal line;

the latch outputs a first control signal to the second selection control terminal of the second selection circuit through the output terminal of the latch within the time duration from receipt of the first touch scan signal by the first input terminal to receipt of the second touch scan signal by the second input terminal, and outputs a second control signal through the output terminal of the latch within other time durations; and the second selection circuit outputs the touch signal from the first signal outputting terminal when receiving the first control signal, and outputs the common voltage signal from the first signal outputting terminal when receiving the second control signal.

Figure 20:
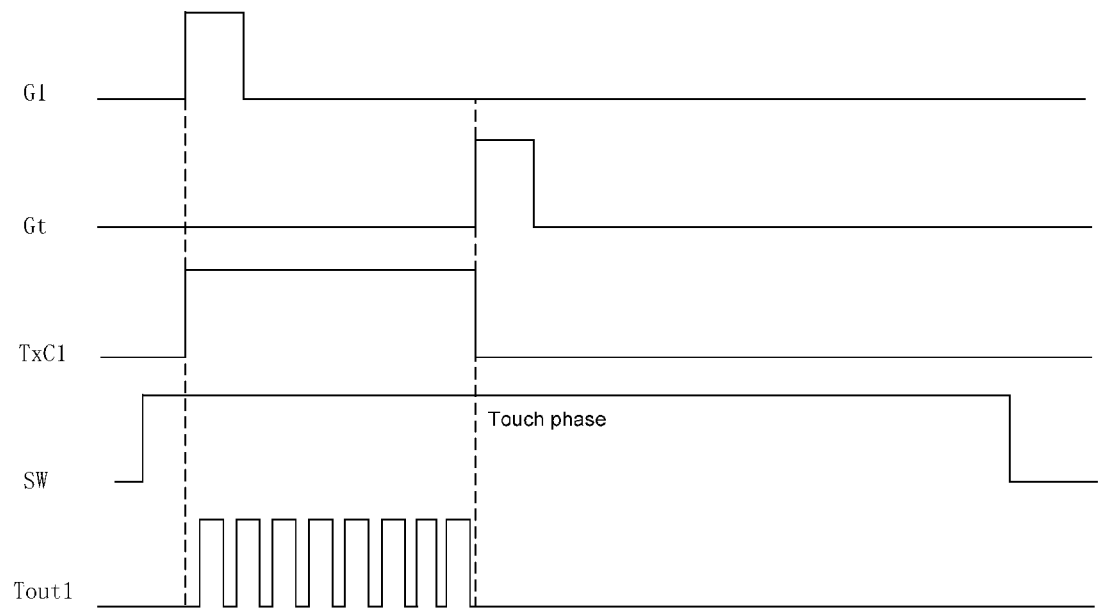
FIG. 20 is a timing diagram of a second driving method, according to embodiments of the disclosure.

FIG. 20 is a timing diagram of a second driving method, according to embodiments of the disclosure. As shown in FIG. 20, in the time interval between frame scanning periods, a high-level signal is outputted from the operating mode signal line SW, and the array substrate operates in the touch phase, so that the first shift register VSR1_1 generates and outputs the first touch scan signal G1 to the first selection circuit 231 connected with the first shift register VSR1_1, and the first selection circuit 231 outputs the first touch scan signal G1 to the latch. Thus the latch starts to output the first control signal which is a high-level signal, according to the first touch scan signal G1. After receiving the first control signal, the second selection circuit connects the touch signal inputting terminal Tx with the first signal outputting terminal in order to output the touch signal Tout. In the case of presence of m touch electrodes in each row of touch electrodes, the touch signal inputting terminal includes ports TX1, TX2, . . . , TXm, each of which corresponds to one of the m touch electrodes, accordingly, the first signal outputting terminal likewise includes ports Tout1, Tout2, ..., Toutm, so as to output the touch signals to the respective touch electrodes. Until the second shift register VSR1_t generates and outputs the second touch scan signal Gt to the latch, the latch stops outputting the first control signal TXC1 and starts to output the second control signal which is a low-level signal. Under the control of the second control signal controls, the second selection circuit stops outputting the touch signal, and connects the common voltage signal inputting terminal Vcom with the first signal outputting terminal, so as to output the common voltage signal to the respective touch electrodes simultaneously.

It is noted that the embodiments and the applied technology principles of the present disclosure are described as above. It should be understood for those skilled in the art that the disclosure is not limited to particular embodiments described herein. Various apparent changes, readjustment and substitution can be made by those skilled in the art without departing the scope of protection of the disclosure. Therefore, although the disclosure is illustrated in detail through the above embodiments, the disclosure is not limited to the above embodiments, and can further include more of other equivalent embodiments without departing the conception of the disclosure.

Various modifications and additions can be made to the exemplary embodiments discussed without departing from the scope of the disclosure. For example, while the embodiments described above refer to particular features, the scope of this disclosure also includes embodiments having different combinations of features and embodiments that do not include all of the described features. Accordingly, the scope of the disclosure is intended to embrace all such alternatives, modifications, and variations as fall within the scope of the claims, together with all equivalents thereof.

We claim:

1. An array substrate, comprising:
a display region;
a non-display region surrounding the display region;
pixel units arranged as an array in the display region; and
a driver circuit disposed in the non-display region,
wherein the driver circuit comprises:
a first shift register comprising a first scan signal outputting terminal, wherein the first shift register is configured to output a first touch scan signal from the first scan signal outputting terminal within an interval between frame scanning periods of the array substrate; and
a touch scanning circuit corresponding to the first shift register and comprising a first scan signal inputting terminal and a touch signal outputting terminal, wherein the first scan signal inputting terminal of the touch scanning circuit is connected with the first scan signal outputting terminal of the first shift register, and the touch scanning circuit is configured to output a touch signal from the touch signal outputting terminal according to the first touch scan signal, and
wherein the driver circuit further comprises a clock signal supplying module connected with the first shift register; in the frame scanning period, the first shift register is configured to generate a first display scan signal according to a first clock signal provided by the clock signal supplying module, and in the interval between the frame scanning periods, the first shift register is configured to generate a first touch scan signal according to a second clock signal provided by the clock signal supplying module.

2. The array substrate of claim 1, wherein a common electrode in the display region of the array substrate comprises a plurality of touch electrodes arranged in a matrix, each of the touch electrodes is assigned with a corresponding touch wiring, and each row of the touch electrodes are connected with the touch signal outputting terminal of the same touch scanning circuit via corresponding touch wirings.

3. The array substrate of claim 1, wherein the clock signal supplying module comprises at least one clock selection circuit, and the clock selection circuit comprises a clock selection control terminal, a first clock signal inputting terminal, a second clock signal inputting terminal, and a clock signal outputting terminal, wherein the clock selection control terminal is connected with an operating mode signal line, and the clock signal outputting terminal is connected with the first shift register; the clock selection circuit is configured to connect the first clock signal inputting terminal with the clock signal outputting terminal when receiving a display scan mode signal from the operating mode signal line; and to connect the second clock signal inputting terminal with the clock signal outputting terminal when receiving a touch scan mode signal from the operating mode signal line.

4. The array substrate of claim 3, wherein the touch scanning circuit comprises a first selection circuit and a second selection circuit, wherein the first selection circuit comprises a first selection control terminal, a first scan signal inputting terminal, a touch scan signal outputting terminal and a display scan signal outputting terminal; wherein the first selection circuit is connected with the first shift register, the first selection control terminal of the first selection circuit connected with the first shift register is connected with the operating mode signal line, and the first scan signal inputting terminal is connected with the first scan signal outputting terminal of the first shift register, wherein the first selection circuit connected with the first shift register is configured to output, via the display scan signal outputting terminal, the first display scan signal received at the first scan signal inputting terminal when receiving a display scan mode signal from the operating mode signal line, and to output, via the touch scan signal outputting terminal, the first touch scan signal received at the first scan signal inputting terminal when receiving the touch scan mode signal from the operating mode signal line; and the second selection circuit comprises a second selection control terminal, a common voltage signal inputting terminal, a touch signal inputting terminal and a first signal outputting terminal, wherein the common voltage signal inputting terminal is connected with a common signal line, the touch signal inputting terminal is connected with a touch signal line, and the first signal outputting terminal is connected with the touch wiring, wherein the second selection circuit is configured to output, via the first signal outputting terminal, the touch signal received at the touch signal inputting terminal, or to output, via the first signal outputting terminal, the common voltage signal received at the common voltage signal inputting terminal, depending on the type of the signal received by the second selection control terminal.

5. The array substrate of claim 4, wherein the touch scan signal outputting terminal of the first selection circuit connected with the first shift register is connected with the second selection control terminal of the second selection circuit, and the second selection circuit is configured to output, via the first signal outputting terminal, the touch signal received at the touch signal inputting terminal in a time period of receiving the first touch scan signal, or otherwise to output, via the first signal outputting terminal, the common voltage signal received at the common voltage signal inputting terminal in other time periods.

6. The array substrate of claim 4, wherein the driver circuit comprises a plurality of cascadedly-connected shift registers respectively corresponding to rows of pixel units, and the plurality of cascadedly-connected shift registers are divided into at least two groups; wherein each group of shift registers is configured to drive at least two consecutive rows of pixel units, and the first shift register is an initial shift register in the group of shift registers; a third selection circuit is provided for each of remaining shift registers in each group of shift registers except for the initial shift register, a selection control terminal of the third selection circuit is connected with the operating mode signal line, an input terminal of the third selection circuit is connected with the scan signal outputting terminal of the corresponding one of the remaining shift registers, and an output terminal of the third selection circuit is connected with a scan line of the array substrate, wherein the third selection circuit is configured to output, via the output terminal of the third selection circuit, the display scan signal received at the scan signal inputting terminal of the corresponding one of the remaining shift registers when receiving the display scan mode signal from the operating mode signal line.

7. The array substrate of claim 6, wherein in the interval between the frame scanning periods, time duration of the first touch scan signal generated by the initial shift register from each group of shift registers according to the second clock signal provided by the clock signal supplying module is longer than time duration of the touch scan signal generated by the remaining shift registers from the group of shift registers.

8. The array substrate of claim 6, wherein the driver circuit further comprises a second shift register comprising a second scan signal outputting terminal, and the second shift register is configured to output a second touch scan signal through the second scan signal outputting terminal within the interval between the frame scanning periods of the array substrate; and the touch scanning circuit further comprises a second scan signal inputting terminal which is connected with the second scan signal outputting terminal, and the touch scanning circuit is configured to output a touch signal through a touch signal outputting terminal of the touch scanning circuit according to the first touch scan signal and the second touch scan signal.

9. The array substrate of claim 8, wherein the second shift register is connected with the clock signal supplying module, in the frame scanning period, the second shift register is configured to generate a second display scan signal according to the first clock signal provided by the clock signal supplying module; and in the interval between frame scanning periods, the second shift register is configured to generate a second touch scan signal according to the second clock signal provided by the clock signal supplying module.

10. The array substrate of claim 9, wherein the touch scanning circuit further comprises a first selection circuit connected with the second shift register, and a latch; wherein a touch scan signal outputting terminal of the first selection circuit connected with the first shift register is connected with a first input terminal of the latch, and an output terminal of the latch is connected with the second selection control terminal of the second selection circuit; a first selection control terminal of the first selection circuit connected with the second shift register is connected with the operating mode signal line, and the first scan signal inputting terminal is connected with the second scan signal outputting terminal of the second shift register; wherein the first selection circuit connected with the second shift register is configured to output, via the display scan signal outputting terminal of the first selection circuit connected with the second shift register, the second display scan signal received at the second scan signal inputting terminal when receiving a display scan mode signal from the operating mode signal line, and to output, via the touch scan signal outputting terminal of the first selection circuit connected with the second shift register, the second touch scan signal received at the second scan signal inputting terminal when receiving a touch scan mode signal from the operating mode signal line; and a touch scan signal outputting terminal of the first selection circuit connected with the second shift register is connected with a second input terminal of the latch; the latch is configured to output a first control signal to the second selection control terminal of the second selection circuit through the output terminal of the latch within time duration from receipt of the first touch scan signal by the first input terminal of the latch to receipt of the second touch scan signal by the second input terminal of the latch, and to output a second control signal to the second selection control terminal of the second selection circuit through the output terminal of the latch within other time durations; and the second selection circuit is configured to output, via the first signal outputting terminal, the touch signal received at the touch signal inputting terminal when receiving the first control signal from the second selection control terminal, and to output, via the first signal outputting terminal, the common voltage signal received at the common voltage signal inputting terminal when receiving the second control signal from the second selection control terminal.

11. The array substrate of claim 8, wherein the second shift register is an ending shift register in each group of shift registers; and a third selection circuit is provided for each of remaining shift registers in each group of shift registers except for the first shift register and the second shift register.

12. The array substrate of claim 3, wherein the clock selection circuit comprises a first inverter, a second inverter, a third inverter, and a first set of transmission gates;

an input terminal of the first inverter and an input terminal of the second inverter are connected to the clock selection control terminal of the clock selection circuit, and an input terminal of the third inverter is connected with an output terminal of the second inverter; the first set of transmission gates comprises a first NMOS transistor, a first PMOS transistor, a second NMOS transistor and a second PMOS transistor, wherein a gate electrode of the first NMOS transistor is connected with the input terminal of the first inverter, a gate electrode of the first PMOS transistor is connected with the output terminal of the first inverter, a drain electrode of the first NMOS transistor and a source electrode of the first PMOS transistor are connected with each other and both connected with the second clock signal inputting terminal of the clock selection circuit, a source electrode of the first NMOS electrode and a drain electrode of the first PMOS transistor are connected with each other and both connected with the clock signal outputting terminal of the clock selection circuit, a gate electrode of the second NMOS electrode is connected with the output terminal of the second inverter, a gate electrode of the second PMOS electrode is connected with the output terminal of the third inverter, a drain electrode of the second NMOS transistor and a source electrode of the second PMOS transistor are connected with each other and both connected with the first clock signal inputting terminal of the clock selection circuit, and a source electrode of the second NMOS transistor and a drain electrode of the second PMOS transistor are connected with each other and both connected with the clock signal outputting terminal of the corresponding clock selection circuit.

13. The array substrate of claim 4, wherein the first selection circuit comprises a fourth inverter, a fifth inverter, a sixth inverter, a second set of transmission gates, a first pull-down PMOS transistor and a second pull-down PMOS transistor;
an input terminal of the fourth inverter is connected with the first selection control terminal of the first selection circuit, an input terminal of the fifth inverter is connected with the first selection control terminal of the first selection circuit, and the an input terminal of the sixth inverter is connected with an output terminal of the fifth inverter;
the second set of transmission gates comprises a third NMOS transistor, a third PMOS transistor, a fourth NMOS transistor and a fourth PMOS transistor, wherein a gate electrode of the third NMOS transistor is connected with the input terminal of the fourth inverter, a gate electrode of the third PMOS transistor is connected with the output terminal of the fourth inverter, a source electrode of the third NMOS transistor and a drain electrode of the fourth PMOS transistor 644 are connected with each other and both connected with the touch scan signal outputting terminal of the first selection circuit, a drain electrode of the third NMOS transistor and a source electrode of the third PMOS transistor are connected with each other and both connected with the first scan signal inputting terminal of the first selection circuit, a gate electrode of the fourth NMOS transistor is connected with the output terminal of the fifth inverter, a gate electrode of the fourth PMOS transistor is connected with the output terminal of the sixth inverter, a drain electrode of the fourth NMOS transistor and a source electrode of the fourth PMOS transistor are connected with each other and both connected with the first scan signal inputting terminal of the first selection circuit, and a source electrode of the fourth NMOS transistor and a drain electrode of the fourth PMOS transistor are connected with each other and both connected with the display scan signal outputting terminal of the first selection circuit; a gate electrode of the first pull-down PMOS transistor is connected with the first selection control terminal of the first selection circuit, a source electrode of the first pull-down PMOS transistor is connected with the low-level signal line VGL, and a drain electrode of the first pull-down PMOS transistor is connected with the touch scan signal outputting terminal of the first selection circuit; and a gate electrode of the second pull-down PMOS transistor is connected with the output terminal of the fifth inverter, a source electrode of the second pull-down PMOS transistor is connected with the low-level signal line VGL, and a drain electrode of the second pull-down PMOS transistor is connected with the display scan signal outputting terminal of the first selection circuit.

14. The array substrate of claim 4, wherein the second selection circuit comprises a seventh inverter, an eighth inverter, a ninth inverter, and at least one third set of transmission gates:
an input terminal of the seventh inverter is connected with the second selection control terminal of the second selection circuit, an input terminal of the eighth inverter is connected with the second selection control terminal of the second selection circuit, and the an input terminal of the ninth inverter is connected with an output terminal of the eighth inverter;
the third set of transmission gates comprises a fifth NMOS transistor, a fifth PMOS transistor, a sixth NMOS transistor and a sixth PMOS transistor, wherein a gate electrode of the fifth NMOS transistor is connected with the input terminal of the seventh inverter, a gate electrode of the fifth PMOS transistor is connected with the output terminal of the seventh inverter, a drain electrode of the fifth NMOS transistor and a source electrode of the fifth PMOS transistor are connected with each other and both connected with the touch signal inputting terminal of the second selection circuit, a source electrode of the fifth NMOS transistor and a drain electrode of the fifth PMOS transistor are connected with each other and both connected with the first signal outputting terminal of the second selection circuit, a gate electrode of the sixth NMOS transistor is connected with the output terminal of the eighth inverter, a gate electrode of the sixth PMOS transistor is connected with the output terminal of the ninth inverter, a drain electrode of the sixth NMOS transistor and a source electrode of the sixth PMOS transistor are connected with each other and both connected with the first signal outputting terminal of the second selection circuit, and a source electrode of the sixth NMOS transistor and a drain electrode of the sixth PMOS transistor are connected with each other and both connected with the common voltage signal inputting terminal of the second selection circuit.

15. The array substrate of claim 10, wherein the latch comprises a tenth inverter, a first clock inverter, a second clock inverter, an eleventh inverter and a first thin film transistor, wherein an input terminal of the tenth inverter is connected with the first input terminal of the latch, and an output terminal of the tenth inverter is connected to a first control terminal of the first clock inverter and a second control terminal of the second clock inverter; both an input terminal and a second control terminal of the first clock inverter are connected with the first input terminal of the latch, and an output terminal of the first clock inverter is connected with an output terminal of the second clock inverter;
a first control terminal of the second clock inverter is connected with the first input terminal of the latch, and an input terminal of the second clock inverter is connected with an output terminal of the eleventh inverter; an input terminal of the eleventh inverter is connected with an output terminal of the first thin film transistor, and the output terminal of the eleventh inverter is connected with the output terminal of the latch; and a gate electrode of the first thin film transistor is connected with the second input terminal of the latch, and an input terminal of the first thin film transistor is connected with a high-level signal inputting terminal.

16. The array substrate of claim 11, wherein the third selection circuit comprises a twelfth inverter, a seventh NMOS transistor, a seventh PMOS transistor and an eighth PMOS transistor; an input terminal of the twelfth inverter is connected with a gate electrode of the seventh PMOS transistor and is further connected with a third selection control terminal of the third selection circuit; an output terminal of the twelfth inverter is connected with a gate electrode of the seventh NMOS transistor; a drain electrode of the seventh PMOS transistor is connected with a drain electrode of the seventh NMOS transistor and is further connected with a signal inputting terminal of the third selection circuit, and a source electrode of the seventh PMOS transistor is connected with a source electrode of the seventh NMOS transistor and is further connected with a signal outputting terminal of the third selection circuit; and a gate electrode of the eighth PMOS transistor is connected with an output terminal of the twelfth inverter, a drain electrode of the eighth PMOS transistor is connected with the signal outputting terminal of the third selection circuit, and a source electrode of the eighth PMOS transistor is connected with the low-level signal line.

17. The array substrate of claim 1, wherein the driver circuit comprises at least two the touch scanning circuits, which are disposed in at least one of: the non-display region on a first peripheral side of the array substrate and the non-display region on a second peripheral side of the array substrate.

18. The array substrate of claim 17, wherein in the case that the touch scanning circuit and the first shift register or the second shift register connected with the touch scanning circuit are located in the non-display region at different peripheral sides of the array substrate, the first shift register or the second shift register is connected with the touch scanning circuit through a conductive wiring running through the display region of the array substrate.

19. A touch display panel, comprising a color filter substrate, an array substrate according to claim 1, and a driver chip which is connected with the driver circuit on the array substrate.

20. A driving method for an array substrate, wherein the array substrate comprises: a display region; a non-display region surrounding the display region; pixel units arranged as an array in the display region; and a driver circuit disposed in the non-display region, and wherein the driver circuit comprises a first shift register and a touch scanning circuit corresponding to the first shift register, and the driving method comprises:
  outputting a first touch scan signal from a first scan signal outputting terminal of the first shift register in an interval between frame scanning periods of the array substrate; and
  outputting a touch signal from a touch signal outputting terminal of the touch scanning circuit according to the first touch scan signal,
  wherein, in the frame scanning process, the first shift register generates a first display scan signal according to the first clock signal provided by the clock signal supplying module, and in the interval between frame scanning processes, the first shift register generates a first touch scan signal according to the second clock signal provided by the clock signal supplying module.

21. The driving method of claim 20, wherein the touch scanning circuit comprises a first selection circuit and a second selection circuit; wherein the first selection circuit connected with the first shift register is configured to output, via a display scan signal outputting terminal of the first selection circuit connected with the first shift register, the first display scan signal received at the first scan signal inputting terminal when receiving a display scan mode signal from an operating mode signal line, and to output, via a touch scan signal outputting terminal of the first selection circuit connected with the first shift register, the first touch scan signal received at the first scan signal inputting terminal when receiving a touch scan mode signal from the operating mode signal line; and the second selection circuit is configured to output, via the first signal outputting terminal, the touch signal received at the touch signal inputting terminal, or to output, via the first signal outputting terminal, the common voltage signal received at the common voltage signal inputting terminal, depending on types of the signals received by the second selection control terminal.

22. The driving method of claim 21, wherein the touch scan signal outputting terminal of the first selection circuit connected with the first shift register is connected with a second selection control terminal of the second selection circuit, and the second selection circuit is configured to output, via the first signal outputting terminal, the touch signal received at the touch signal inputting terminal in a time period of receiving the first touch scan signal, or otherwise to output, via the first signal outputting terminal, the common voltage signal received at the common voltage signal inputting terminal in other time periods.

23. The driving method of claim 22, wherein in the interval between frame scanning periods, for each group of shift registers, time duration of the first touch scan signal generated by an initial shift register from the group of shift registers according to the second clock signal provided by the clock signal supplying module is longer than time duration of the touch scan signals generated by remaining shift registers from the group of shift registers.

24. The driving method of claim 21, wherein the driver circuit further comprises a second shift register, wherein the second shift register is configured to output a second touch scan signal through a second scan signal outputting terminal of the second shift register in the time interval between frame scanning periods of the array substrate; and
  the touch scanning circuit is configured to output the touch signal from the touch signal outputting terminal based on the first touch scan signal and the second touch scan signal.

25. The driving method of claim 24, wherein the second shift register is configured to generate the second touch scan signal in the time interval between frame scanning periods according to the second clock signal provided by the clock signal supplying module, and to generate a second display scan signal in the frame scanning period according to the first clock signal provided by the clock signal supplying module.

26. The driving method of claim 25, wherein the touch scanning circuit further comprises a first selection circuit connected with the second shift register, and a latch; wherein a touch scan signal outputting terminal of the first selection circuit connected with the first shift register is connected with a first input terminal of the latch, a touch scan signal outputting terminal of the first selection circuit connected with the second shift register is connected with a second input terminal of the latch, and an output terminal of the latch is connected with the second selection control terminal of the second selection circuit; and the driving method further comprises that:
  the first selection circuit connected with the second shift register outputs the second display scan signal from the display scan signal outputting terminal of the first selection circuit connected with the second shift register when receiving a display scan mode signal from the operating mode signal line, and outputs the second touch scan signal from the touch scan signal outputting terminal of the first selection circuit connected with the second shift register when receiving a touch scan mode signal from the operating mode signal line;
  the latch outputs a first control signal to the second selection control terminal of the second selection circuit through the output terminal of the latch within time duration from receipt of the first touch scan signal by the first input terminal to receipt of the second touch scan signal by the second input terminal, and outputs a second control signal through the output terminal of the latch within other time durations; and the second selection circuit outputs the touch signal from the first signal outputting terminal when receiving the first control signal, and outputs the common voltage signal from the first signal outputting terminal when receiving the second control signal.

\* \* \* \* \*